United States Patent
Zhao et al.

(10) Patent No.: US 11,977,167 B2
(45) Date of Patent: May 7, 2024

(54) EFFICIENT ALGORITHM FOR PROJECTING WORLD POINTS TO A ROLLING SHUTTER IMAGE

(71) Applicant: Waymo LLC, Mountain View, CA (US)

(72) Inventors: Sheng Zhao, Mountain View, CA (US); Nicholas Lloyd Armstrong-Crews, Mountain View, CA (US); Volker Grabe, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 761 days.

(21) Appl. No.: 17/105,141

(22) Filed: Nov. 25, 2020

(65) Prior Publication Data

US 2021/0208283 A1    Jul. 8, 2021

Related U.S. Application Data

(60) Provisional application No. 62/943,688, filed on Dec. 4, 2019.

(51) Int. Cl.
*H04N 23/68* (2023.01)
*G01S 7/481* (2006.01)
(Continued)

(52) U.S. Cl.
CPC .......... *G01S 17/931* (2020.01); *G01S 7/4817* (2013.01); *G01S 17/89* (2013.01); *H04N 23/689* (2023.01); *G01S 7/51* (2013.01)

(58) Field of Classification Search
CPC ...... G01S 17/931; G01S 7/4817; G01S 17/89; G01S 7/51; H04N 23/689
(Continued)

(56) References Cited

U.S. PATENT DOCUMENTS 9,476,730 B2 * 10/2016 Samarasekera .... G01C 21/3867
9,792,709 B1 * 10/2017 Meler .................. H04N 23/698
(Continued)

FOREIGN PATENT DOCUMENTS

WO    2019079311 A1    4/2019
WO    2020069034 A1    4/2020

OTHER PUBLICATIONS

Erik Ringaby, Geometric Computer Vision for Rolling-shutter and Push-broom Sensors, Published Jun. 2012 by Linkoping University, pp. 1-38 (pdf).*

(Continued)

*Primary Examiner* — Manglesh M Patel
(74) *Attorney, Agent, or Firm* — McDonnell Boehnen Hulbert & Berghoff LLP

(57) ABSTRACT

An improved, efficient method for mapping world points from an environment (e.g., points generated by a LIDAR sensor of an autonomous vehicle) to locations (e.g., pixels) within rolling-shutter images taken of the environment is provided. This improved method allows for accurate localization of the world point in a rolling-shutter image via an iterative process that converges in very few iterations. The method poses the localization process as an iterative process for determining the time, within the rolling-shutter exposure period of the image, at which the world point was imaged by the camera. The method reduces the number of times the world point is projected into the normalized space of the camera image, often converging in three or fewer iterations.

17 Claims, 8 Drawing Sheets

(51) Int. Cl.
*G01S 17/89* (2020.01)
*G01S 17/931* (2020.01)
*G01S 7/51* (2006.01)

(58) Field of Classification Search
USPC .......................................................... 701/301
See application file for complete search history.

(56) References Cited

U.S. PATENT DOCUMENTS

| | | | | |
|---|---|---|---|---|
| 9,973,696 | B1* | 5/2018 | Meler | H04N 5/2624 |
| 10,108,867 | B1* | 10/2018 | Vallespi-Gonzalez | G06V 20/58 |
| 11,430,224 | B2* | 8/2022 | Saranin | G06V 20/58 |
| 2017/0010618 | A1* | 1/2017 | Shashua | G08G 1/096805 |
| 2017/0030703 | A1* | 2/2017 | Cosic | G01S 13/86 |
| 2018/0149753 | A1 | 5/2018 | Shin et al. | |
| 2018/0288320 | A1* | 10/2018 | Melick | G01S 13/931 |
| 2019/0098233 | A1 | 3/2019 | Gassend et al. | |
| 2019/0291728 | A1* | 9/2019 | Shalev-Shwartz | G01S 13/931 |
| 2019/0310372 | A1 | 10/2019 | Crouch et al. | |
| 2019/0353784 | A1* | 11/2019 | Toledano | G05D 1/0212 |
| 2021/0004610 | A1* | 1/2021 | Huang | G06T 7/74 |
| 2021/0239812 | A1 | 8/2021 | Meng et al. | |
| 2021/0256722 | A1* | 8/2021 | Staab | G01S 17/89 |
| 2021/0354719 | A1* | 11/2021 | Wang | G06V 20/588 |

OTHER PUBLICATIONS

Gaspard Duchamp et al., A Rolling Shutter Compliant Method for Localization and Reconstruction, Published 2015 by Scitepress, pp. 1-8 (pdf).*
Saurer et al., "Rolling Shutter Stereo", Computer Vision Foundation, 8 pages.
Kerl et al., "Dense Continuous-Time Tracking and Mapping with Rolling Shutter RGB-D Cameras", Computer Vision Foundation, 9 pages.
Oth et al., "Rolling Shutter Camera Calibration", 9 pages.
Bapat et al., "Rolling Shutter and Radial Distortion are Features for High Frame Rate Multi-Camera Tracking", 10 pages.
Jiyong Jeong et al., Road is Enough! Extrinsic Calibration of Non-overlapping Stereo Camera and LiDAR using Road Information, IEEE Robotics and Automation Letters, vol. 4, Issue 3, pp. 1-8, Feb. 2019.
Guolai Jiang et al., A Simultaneous Localization and Mapping (SLAM) Framework for 2.5D Map Building Based on Low-Cost LiDAR and Vision Fusion, Applied Sciences, pp. 1-17, May 22, 2019.
International Search Report and Written Opinion for PCT/US2020/062365, dated Mar. 22, 2021.

* cited by examiner

EFFICIENT ALGORITHM FOR PROJECTING WORLD POINTS TO A ROLLING SHUTTER IMAGE

INCORPORATION BY REFERENCE OF TEXT FILE

This application incorporates by reference, in its entirety, the contents of the ASCII-formatted text file named "camera_model.txt" (size 48,446 bytes, created on Dec. 4, 2019), submitted electronically on Dec. 4, 2019 along with the instantly filed application.

BACKGROUND

Active sensors, such as light detection and ranging (LIDAR) sensors, radio detection and ranging (RADAR) sensors, and sound navigation and ranging (SONAR) sensors, among others, can scan an environment by emitting signals toward the environment and detecting reflections of the emitted signals. Passive sensors, such as image sensors (e.g., cameras) and microphones among others, can detect signals originating from sources in the environment.

An example LIDAR sensor can determine distances to environmental features while scanning through a scene to assemble a "point cloud" indicative of reflective surfaces. Individual points in the point cloud can be determined, for example, by transmitting a laser pulse and detecting a returning pulse, if any, reflected from an object in the environment, and then determining a distance to the object according to a time delay between the transmission of the pulse and the reception of its reflection. Thus, a three-dimensional map of points indicative of locations of reflective features in the environment can be generated.

An example image sensor can capture an image of a scene viewable to the image sensor. For instance, the image sensor may include an array of complementary metal oxide semiconductor (CMOS) active pixel sensors, or other types of light sensors. Each CMOS sensor may receive a portion of light from the scene incident on the array. Each CMOS sensor may then output a measure of the amount of light incident on the CMOS sensor during an exposure time when the CMOS sensor is exposed to the light from the scene. With this arrangement, an image of the scene can be generated, where each pixel in the image indicates one or more values (e.g., colors, etc.) based on outputs from the array of CMOS sensors.

SUMMARY

In one example, a method includes: (i) obtaining an indication of a point in an environment of an autonomous vehicle; (ii) obtaining information about the location and motion of the autonomous vehicle within the environment; (iii) obtaining an image of a portion of the environment of the autonomous vehicle, wherein the image comprises a plurality of rows of pixels, and wherein the image was generated by a camera operating in a rolling shutter mode such that each row of pixels represents light sensed by the camera during a respective exposure time period; and (iv) mapping the point in the environment to a location within the image. Mapping the point in the environment to a location within the image includes: (a) determining an initial estimated time, $T_0$, that the camera sensed light from the point in the environment; (b) determining N updated estimated times, $T_1$, wherein N≥1; and (c) determining, based on the updated estimated time, $T_N$, a location within the image that corresponds to the point in the environment. Each updated estimated time, $T_i$, is determined by an update process including: (1) determining based on the information about the location and motion of the autonomous vehicle, a pose of the camera at the estimated time, $T_{i-1}$, (2) based on the pose of the camera at the estimated time, $T_{i-1}$, projecting the point in the environment to a projected location within the image, (3) evaluating a cost function that includes a term based on the estimated time, $T_{i-1}$, and a term based on a mapping from the projected location to a time that the camera sensed light represented at the projected location within the image, and (4) determining the updated estimated time, $T_i$, based on the evaluated cost function.

In another example, a non-transitory computer readable medium has stored therein instructions executable by a computing device to cause the computing device to perform operations. The operations include: (i) obtaining an indication of a point in an environment of an autonomous vehicle; (ii) obtaining information about the location and motion of the autonomous vehicle within the environment; (iii) obtaining an image of a portion of the environment of the autonomous vehicle, wherein the image comprises a plurality of rows of pixels, and wherein the image was generated by a camera operating in a rolling shutter mode such that each row of pixels represents light sensed by the camera during a respective exposure time period; and (iv) mapping the point in the environment to a location within the image. Mapping the point in the environment to a location within the image includes: (a) determining an initial estimated time, $T_0$, that the camera sensed light from the point in the environment; (b) determining N updated estimated times, $T_i$, wherein N≥1; and (c) determining, based on the updated estimated time, $T_N$, a location within the image that corresponds to the point in the environment. Each updated estimated time, $T_i$, is determined by an update process including: (1) determining based on the information about the location and motion of the autonomous vehicle, a pose of the camera at the estimated time, $T_{i-1}$, (2) based on the pose of the camera at the estimated time, $T_{i-1}$, projecting the point in the environment to a projected location within the image, (3) evaluating a cost function that includes a term based on the estimated time, $T_{i-1}$, and a term based on a mapping from the projected location to a time that the camera sensed light represented at the projected location within the image, and (4) determining the updated estimated time, $T_i$, based on the evaluated cost function.

In yet another example, a system includes: (i) a light detection and ranging (LIDAR) sensor coupled to a vehicle; (ii) a camera coupled to the vehicle, wherein the camera is configured to obtain image data indicative of the environment of the vehicle; and (iii) a controller, wherein the controller is operably coupled to the LIDAR sensor and the camera. The controller includes one or more processors configured to perform operations including: (a) operating the LIDAR sensor to generate a plurality of LIDAR data points indicative of distances to one or more objects in the environment of the vehicle; (b) generating an indication of a point in the environment based on at least one LIDAR data point of the plurality of LIDAR data points; (c) operating the camera in a rolling shutter mode to generate an image of a portion of the environment of the vehicle, wherein the image comprises a plurality of rows of pixels, and wherein each row of pixels represents light sensed by the camera during a respective exposure time period; (d) obtaining information about the location and motion of the autonomous vehicle within the environment; and (e) mapping the point in the environment to a location within the image. Mapping the point in the environment to a location within the image includes: (1) determining an initial estimated time, $T_0$, that the camera sensed light from the point in the environment; (2) determining N updated estimated times, $T_i$, wherein N≥1; and (3) determining, based on the updated estimated time, $T_N$, a location within the image that corresponds to the point in the environment. Each updated estimated time, $T_i$, is determined by an update process including: (I) determining, based on the information about the location and motion of the autonomous vehicle, a pose of the camera at the estimated time, $T_{i-1}$, (II) based on the pose of the camera at the estimated time, $T_{i-1}$, projecting the point in the environment to a projected location within the image, (III) evaluating a cost function that includes a term based on the estimated time, $T_{i-1}$, and a term based on a mapping from the projected location to a time that the camera sensed light represented at the projected location within the image, and (IV) determining the updated estimated time, $T_i$, based on the evaluated cost function.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations.

I. EXAMPLE SENSORS

Although example sensors described herein include LIDAR sensors and cameras (or image sensors), other types of sensors are possible as well. A non-exhaustive list of example sensors that can be alternatively employed herein without departing from the scope of the present disclosure includes RADAR sensors, SONAR sensors, sound sensors (e.g., microphones, etc.), motion sensors, temperature sensors, pressure sensors, etc.

To that end, example sensors herein may include active sensors that emit a signal (e.g., a sequence of pulses or any other modulated signal) based on modulated power provided to the sensor, and then detects reflections of the emitted signal from objects in the surrounding environment. Alternatively or additionally, example sensors herein may include passive sensors (e.g., cameras, microphones, antennas, pressure sensors, etc.) that detect external signals (e.g., background signals, etc.) originating from external source(s) in the environment.

Figure 1:
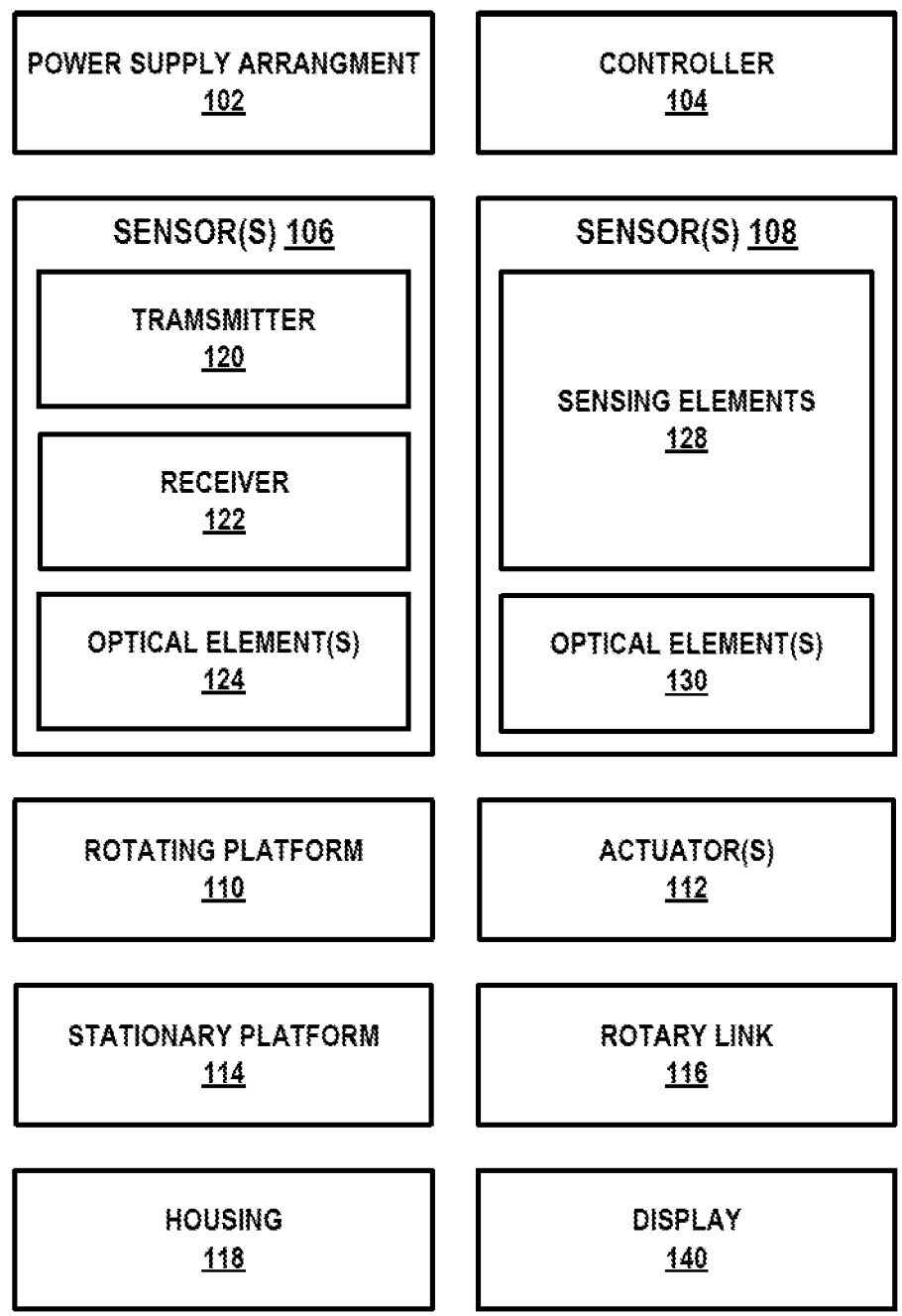
FIG. 1 is a simplified block diagram of a system, according to example embodiments.

Referring now to the figures, FIG. 1 is a simplified block diagram of a system 100 that includes sensors (e.g., synchronized sensors), according to an example embodiment. As shown, system 100 includes a power supply arrangement 102, a controller 104, one or more sensors 106, one or more sensors 108, a rotating platform 110, one or more actuators 112, a stationary platform 114, a rotary link 116, a housing 118, and a display 140.

In other embodiments, system 100 may include more, fewer, or different components. Additionally, the components shown may be combined or divided in any number of ways. For example, sensor(s) 108 can be implemented as a single physical component (e.g., camera ring). Alternatively, for example, sensor(s) 108 can be implemented as an arrangement of separate physical components. Other examples are possible. Thus, the functional blocks of FIG. 1 are illustrated as shown only for convenience in description. Other example components, arrangements, and/or configurations are possible as well without departing from the scope of the present disclosure.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted, etc.) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 116. In another embodiment, one or more functions of controller 104 can be alternatively performed by one or more physically separate controllers that are each disposed within a respective component (e.g., sensor(s) 106, 108, etc.) of system 100.

In some examples, controller 104 may include or otherwise be coupled to wiring used for transfer of control signals to various components of system 100 and/or for transfer of data from various components of system 100 to controller 104. Generally, the data that controller 104 receives may include sensor data based on detections of light by LIDAR 106 and/or camera(s) 108, among other possibilities. Moreover, the control signals sent by controller 104 may operate various components of system 100, such as by controlling emission and/or detection of light or other signal by sensor(s) 106 (e.g., LIDAR, etc.), controlling image pixel capture rate or times via a camera (e.g., included in sensor(s) 108), and/or controlling actuator(s) 112 to rotate rotating platform 110, among other possibilities.

To that end, in some examples, controller 104 may include one or more processors, data storage, and program instructions (stored in the data storage) executable by the one or more processors to cause system 100 to perform the various operations described herein. In some instances, controller 104 may communicate with an external controller or the like (e.g., a computing system arranged in a vehicle, robot, or other mechanical device to which system 100 is mounted) so as to help facilitate transfer of control signals and/or data between the external controller and the various components of system 100.

Additionally or alternatively, in some examples, controller 104 may include circuitry wired to perform the various functions described herein. Additionally or alternatively, in some examples, controller 104 may include one or more special purpose processors, servos, or other types of controllers. For example, controller 104 may include a proportional-integral-derivative (PID) controller or other control loop feedback apparatus that operates actuator(s) 112 to modulate rotation of rotating platform 110 according to a particular frequency or phase. Other examples are possible as well.

Sensors 106 and 108 can optionally include one or more sensors, such as LIDARs, cameras, gyroscopes, accelerometers, encoders, microphones, RADARs, SONARs, thermometers, etc., that scan a surrounding environment of system 100.

Sensor(s) 106 may include any device configured to scan a surrounding environment by emitting a signal and detecting reflections of the emitted signal. For instance, sensor(s) 106 may include any type of active sensor. To that end, as shown, sensor 106 includes a transmitter 120 and a receiver 122. In some implementations, sensor 106 may also include one or more optical elements 124.

Transmitter 120 may be configured to transmit a signal toward an environment of system 100.

In a first example, where sensor 106 is configured as a LIDAR sensor, transmitter 120 may include one or more light sources (not shown) that emit one or more light beams and/or pulses having wavelengths within a wavelength range. The wavelength range could, for example, be in the ultraviolet, visible, and/or infrared portions of the electromagnetic spectrum depending on the configuration of the light sources. In some examples, the wavelength range can be a narrow wavelength range, such as provided by lasers and/or some light emitting diodes. In some examples, the light source(s) in transmitter 120 may include laser diodes, diode bars, light emitting diodes (LEDs), vertical cavity surface emitting lasers (VCSELs), organic light emitting diodes (OLEDs) polymer light emitting diodes (PLEDs), light emitting polymers (LEPs), liquid crystal displays (LCDs), microelectromechanical systems (MEMS), fiber lasers, and/or any other device configured to selectively transmit, reflect, and/or emit light to provide a plurality of emitted light beams and/or pulses.

In a second example, where sensor 106 is configured as an active infrared (ER) camera, transmitter 120 may be configured to emit IR radiation to illuminate a scene. To that end, transmitter 120 may include any type of device (e.g., light source, etc.) configured to provide the IR radiation.

In a third example, where sensor 106 is configured as a RADAR sensor, transmitter 120 may include one or more antennas configured to emit a modulated radio-frequency (RF) signal toward an environment of system 100.

In a fourth example, where sensor 106 is configured as a SONAR sensor, transmitter 120 may include one or more acoustic transducers, such as piezoelectric transducers, magnetostrictive transducers, electrostatic transducers, etc., configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

Receiver 122 may include one or more detectors configured to detect reflections of the signal emitted by transmitter 120.

In a first example, where sensor 106 is configured as a RADAR sensor, receiver 122 may include one or more antennas configured to detect reflections of the RF signal transmitted by transmitter 120. To that end, in some implementations, the one or more antennas of transmitter 120 and receiver 122 can be physically implemented as the same physical antenna structures.

In a second example, where sensor 106 is configured as a SONAR sensor, receiver 122 may include one or more sound sensors (e.g., microphones, etc.) that are configured to detect reflections of the sound signals emitted by transmitter 120. To that end, in some implementations, the one or more components of transmitter 120 and receiver 122 can be physically implemented as the same physical structures (e.g., the same piezoelectric transducer element).

In a third example, where sensor 106 is configured as an active IR camera, receiver 122 may include one or more light detectors (e.g., active pixel sensors, etc.) that are configured to detect a source wavelength of IR light transmitted by transmitter 120 and reflected off a scene toward receiver 122.

In a fourth example, where sensor 106 is configured as a LIDAR sensor, receiver 122 may include one or more light detectors (e.g., photodiodes, avalanche photodiodes, etc.) that are arranged to intercept and detect reflections of the light pulses emitted by transmitter 120 and reflected from one or more objects in a surrounding environment of system 100. To that end, receiver 122 may be configured to detect light having wavelengths in the same wavelength range as the light emitted by transmitter 120. In this way, for instance, sensor 106 (e.g., LIDAR) may distinguish reflected light pulses originated by transmitter 120 from other light originating from external light sources in the environment.

In some instances, receiver 122 may include a photodetector array, which may include one or more detectors each configured to convert detected light (e.g., in the wavelength range of light emitted by transmitter 120) into an electrical signal indicative of the detected light. In practice, such a photodetector array could be arranged in one of various ways. For instance, the detectors can be disposed on one or more substrates (e.g., printed circuit boards (PCBs), flexible PCBs, etc.) and arranged to detect incoming light. Also, such a photodetector array could include any feasible number of detectors aligned in any feasible manner. Additionally, the detectors in the array may take various forms. For example, the detectors may take the form of photodiodes, avalanche photodiodes (e.g., Geiger mode and/or linear mode avalanche photodiodes), silicon photomultipliers (SiPMs), phototransistors, cameras, active pixel sensors (APS), charge coupled devices (CCD), cryogenic detectors, and/or any other sensor of light configured to receive focused light having wavelengths in the wavelength range of the emitted light.

In some implementations, sensor 106 (e.g., in a LIDAR configuration) can select or adjust a horizontal scanning resolution by changing a rate of rotation of the LIDAR and/or adjusting a pulse rate of light pulses emitted by transmitter 120. As a specific example, transmitter 120 can be configured to emit light pulses at a pulse rate of 15,650 light pulses per second. In this example, LIDAR 106 may be configured to rotate at 10 Hz (i.e., ten complete 360° rotations per second). As such, receiver 122 can detect light with a 0.23° horizontal angular resolution. Further, the horizontal angular resolution of 0.23° can be adjusted by changing the rate of rotation of LIDAR 106 or by adjusting the pulse rate. For instance, if LIDAR 106 is instead rotated at 20 Hz, the horizontal angular resolution may become 0.46°. Alternatively, if transmitter 120 emits the light pulses at a rate of 31,300 light pulses per second while maintaining the rate of rotation of 10 Hz, then the horizontal angular resolution may become 0.115°. Other examples are possible as well. Further, in some examples, LIDAR 106 can be alternatively configured to scan a particular range of views within less than a complete 360° rotation of LIDAR 106.

Optical element(s) 124 can be optionally included in or otherwise coupled to transmitter 120 and/or receiver 122. In one example (e.g., where sensor 106 includes a LIDAR sensor), optical element(s) 124 can be arranged to direct light from a light source in transmitter 120 toward the environment. In another example, optical element(s) 124 can be arranged to focus and/or guide light from the environment toward receiver 122. As such, optical element(s) 124 may include any feasible combination of mirror(s), waveguide(s), light filters, lens(es), or any other optical components arranged to guide propagation of light through physical space and/or adjust certain light characteristics. For instance, optical elements 124 may include a light filter arranged to reduce or prevent light having wavelengths outside the wavelength range of the light emitted by transmitter 120 from propagating toward receiver 122. With such arrangement for instance, the light filter can reduce noise due to background light propagating from the scanned environment and originating from an external light source different than light sources of transmitter 120.

Sensor(s) 108 may include any type of sensor configured to scan the surrounding environment. As shown, sensors 108 include an array of sensing elements 128. Further, as shown, sensors 108 can optionally include one or more optical elements 130.

In some examples, sensor(s) 108 may include active sensors (e.g., LIDAR, RADAR, SONAR, etc.) that transmit signals and detect reflections thereof. Thus, although not shown, sensors 108 may include a transmitter and a receiver that are similar to, respectively, transmitter 120 and receiver 122. In other examples, sensor(s) 108 may include passive sensors (e.g., microphones, cameras, image sensors, thermometers, etc.) that detect external signals originating from one or more external sources.

In a first example, where sensor 108 is configured as a sound sensor, sensing elements 128 may include an array of microphones that each detect sounds (e.g., external signals) incident on the respective microphones in the array.

In a second example, where sensor(s) 108 are configured as one or more cameras, the camera(s) may include any camera (e.g., a still camera, a video camera, etc.) configured to capture images of the environment in which system 100 is located. For example, a camera of sensor 108 may include any imaging device that detects and provides data indicative of an image. For instance, sensing elements 128 may include one or more arrangements of light sensing elements that each provide a measure of light incident thereon. To that end, sensing elements 128 may include charge-coupled devices (CCDs), active pixel sensors, complementary metal-oxide-semiconductor (CMOS) photodetectors, N-type metal-oxide-semiconductor (NMOS) photodetectors, among other possibilities.

Further, in some examples, data from sensing elements 128 can be combined according to the arrangement of the sensing elements 128 to generate an image. In one example, data from a two-dimensional (2D) array of sensing elements may correspond to a 2D array of image pixels in the image. In another example, a 3D arrangement of sensing elements (e.g., sensing elements arranged along a curved surface) can be similarly used to generate a 2D array of image pixels in the image. Other examples are possible as well.

In some examples, a sensing element can optionally include multiple adjacent light detectors (or detectors of other types of signals), where each detector is configured to detect light (or other signal) having a particular wavelength or wavelength range. For instance, an image pixel may indicate color information (e.g., red-green-blue or RGB) based on a combination of data from a first detector that detects an intensity of red light, a second detector that detects an intensity of green light, and a third detector that detects an intensity of blue light. Other examples are possible as well.

In one embodiment, sensor(s) 108 may be configured to detect visible light propagating from the scene. Further, in this embodiment, receiver 122 of sensor 106 (e.g., LIDAR receiver) may be configured to detect invisible light (e.g., infrared, etc.) within a wavelength range of light emitted by transmitter 120. In this embodiment, system 100 (or controller 104) can then combine data from sensor 106 (e.g., LIDAR) with data from sensor 108 (e.g., camera) to generate a colored three-dimensional (3D) representation (e.g., point cloud) of the scanned environment.

In some examples, sensor(s) 108 may comprise a plurality of cameras (e.g., a camera ring) disposed in a circular arrangement around an axis of rotation of sensor 106 (e.g., LIDAR). For example, a first camera may be arranged to image a first field-of-view (FOV) of the environment that at least partially overlaps a range of pointing directions of sensor 106 as sensor 106 rotates about the axis (or as the signals transmitted by transmitter 120 are otherwise steered to different pointing directions about the axis). Further, a second camera adjacent to and/or overlapping the first camera may image a second FOV adjacent to the first FOV of the first camera, and so on. In this way, for instance, system 100 may be configured to capture a sequence of images of the respective FOVs simultaneously (and/or synchronously or according to some other timing) with a scan of the environment by sensor 106 as sensor 106 rotates about the axis.

In some examples, sensor(s) 108 may be configured to operate in a rolling shutter mode.

In a first example, where sensor(s) 108 include a microphone array, each output from a microphone in the array may be associated with a respective exposure time period of a corresponding sensing element (e.g., microphone) to external sounds incident on sensor 108.

In a second example, where sensor(s) 108 include one or more cameras, each pixel or group of pixels output by the camera(s) may be associated with a respective exposure time period of a corresponding sensing element or group of sensing elements to external light. By way of example, camera(s) 108 may together provide an array of adjacent rows of sensing elements 128. Further, camera(s) 108 can be configured to output a sequence of image pixels that correspond to measurements of the external light by corresponding sensing elements in the array. For example, camera(s) 108 may output a first row of image pixels based on data from a first row of sensing elements in the array, followed by a second row of image pixels based on data from a second adjacent row of sensing elements in the array, and so on.

In this way, the first image pixel row may be associated with a first exposure time period during which the first row of sensing elements was exposed to light, the second image pixel row may be associated with a second exposure time period during which the second adjacent row of sensing elements was exposed to light, etc. The first exposure time period may begin before the second exposure time period begins. For instance, after a time delay from a start time of the first exposure time period (and optionally before the first exposure time period lapses), camera(s) 108 may start exposing the second adjacent row of sensing elements. Additionally, the first exposure time period may end before the second exposure time period ends. For instance, controller 104 may read outputs from the first row of sensing elements after the first exposure time period ends and while the second row of sensing elements is still being exposed to the external light, and then read outputs from the second row of sensing elements after the second exposure period ends and while a third row of sensing elements is still being exposed to the external light, and so on.

In some examples, where sensor 106 includes an image sensor, system 100 may be configured to select the order in which the sequence of image pixels are obtained from sensing elements 128 in the rolling shutter mode based on an order in which transmitter 120 is emitting light pulses (or other signals). For example, a given row of sensing elements in the array of sensing elements 128 may be aligned (e.g., parallel, etc.) with the axis of rotation of a LIDAR (e.g., sensor 106). For instance, if the axis of rotation of the LIDAR is a vertical axis, then the given row may correspond to a vertical row of sensing elements (e.g., vertical linear arrangement parallel to the axis of rotation of the LIDAR). Further, transmitter 120 may be configured to output a plurality of light beams in an arrangement of one or more vertical lines repeatedly as the LIDAR (e.g., sensor 106) rotates about the axis. As such, for example, sensor(s) 108 (e.g., camera(s)) may output a first row of image pixels using a first row of sensing elements that are arranged similarly (e.g., vertically, etc.) to the arrangement of the plurality of light beams emitted by transmitter 120. Next, camera(s) 108 may then output a second row of image pixels using a second adjacent row of sensing elements in the direction of the rotation of the LIDAR (or other sensor 106). Thus, for instance, the second row of image pixels may be aligned with a second vertical line of light beams emitted by transmitter 120 after sensor 106 rotates toward the second row of sensing elements, and so on.

By scanning vertical rows of sensing elements one after another, for instance, the sequence of image pixels obtained from camera(s) 108 may include a sufficient number of pixels that were captured at times (and from viewing directions) that are similar to the times and directions of LIDAR light pulses (or other signals) emitted by transmitter 120 (e.g., as transmitter 120 rotates about a vertical axis). Whereas, for instance, if the camera(s) (e.g., sensor(s) 108) instead captured the sequence of image pixels using a first horizontal row of sensing elements followed by a second horizontal row of sensing elements and so on, then fewer image pixels may be captured at times (and from viewing directions) that are similar to the times and directions of the LIDAR light pulses.

Optical element(s) 130 may include any combination of optical components such as lens(es), mirror(s), waveguide(s), light filter(s) or any other type of optical component similarly to optical element(s) 124. Further, optical elements 130 can be arranged to focus, direct, and/or adjust light characteristics of incident light for propagation toward sensing elements 128. Further, where sensor(s) 108 include a plurality of cameras for instance, optical element(s) 130 may include a plurality of respective camera lenses that focus external light onto respective image sensors of the cameras.

In some examples, optical element(s) 130 may include one or more light filters that selectively transmit particular wavelengths of light toward one or more particular sensing elements of sensor 106.

In a first example, optical element(s) 130 may include one or more light filters that attenuate light wavelengths of light emitted by transmitter 120. With this arrangement, for instance, system 100 can reduce noise measurements (by sensing element(s) 128) that are associated with the high intensity of light pulses (or other signals) emitted by transmitter 120.

In a second example, sensor 108 may include color image sensors (e.g., Bayer filter sensor, layered pixel sensor array, etc.) configured to indicate colors of incident light. In this example, optical element(s) 130 may include a color filter array, where each color filter of the array transmits red, green, or blue light to a particular sensing element adjacent to the color filter (and attenuates other wavelengths of light). System 100 can then generate (e.g., by combining outputs from multiple sensing elements that sense light having different colors) image pixels that indicate color information (e.g., red, green, and blue, etc.).

In a third example, optical element(s) 130 may include one or more filters that attenuate wavelengths of the light (or other signal) emitted by transmitter 120 and one or more other filters that allow transmission of these wavelengths. For instance, optical element(s) 130 may include a color filter array that includes green, red and blue light filters. In this instance, a relatively large number of the color filters can be configured to attenuate the wavelengths of the emitted light of transmitter 120 to reduce the effects of the high intensity signals emitted by transmitter 120. Further, a relatively smaller number of the color filters (e.g., one or more of the green light filters, etc.) can be configured to (at least partially) allow transmission of wavelengths of the light (or other signal) emitted by transmitter 120. With this arrangement, the high intensity light of transmitter 120 (reflecting off objects in the environment of system 100) can be used to illuminate one or more sensing elements in dark external light conditions (e.g., night time).

Rotating platform 110 may be configured to rotate about an axis. For example, sensor 106 (and/or transmitter 120 and receiver 122 thereof) may be supported (directly or indirectly) by rotating platform 110 such that each of these components moves relative to the environment in response to rotation of rotating platform 110. In particular, each of these components could be rotated (simultaneously) relative to an axis so that sensor 106 may obtain information from various directions. In some examples, the axis of rotation of rotating platform 110 is vertical and a pointing direction of sensor 106 can be adjusted horizontally by the rotation of rotating platform 110 about its vertical axis of rotation. Rotating platform 110 can be formed from any solid material suitable for supporting one or more components (e.g., sensor 106) mounted thereon.

In order to rotate platform 110 in this manner, one or more actuators 112 may actuate rotating platform 110. To that end, actuators 112 may include motors, pneumatic actuators, hydraulic pistons, and/or piezoelectric actuators, among other possibilities.

With this arrangement, controller 104 could operate actuator 112 to rotate rotating platform 110 in various ways so as to obtain information about the environment. In one example, rotating platform 110 could be rotated in either direction. In another example, rotating platform 110 may carry out complete revolutions such that sensor 106 (e.g., LIDAR) provides a 360° horizontal FOV of the environment. Moreover, rotating platform 110 may rotate at various frequencies so as to cause sensor 106 to scan the environment at various refresh rates and/or scanning resolutions.

Alternatively or additionally, system 100 may be configured to adjust the pointing direction of the emitted signal (emitted by transmitter 120) in various ways. In some examples, signal sources (e.g., light sources, antennas, acoustic transducers, etc.) of transmitter 120 can be operated according to a phased array configuration or other type of beam steering configuration.

In a first example, where sensor 106 is configured as a LIDAR sensor, light sources in transmitter 120 can be coupled to phased array optics (e.g., optical elements 124) that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where sensor 106 is configured as a RADAR sensor, transmitter 120 may include an array of antennas, and controller 104 can provide respective phase-shifted control signals for each individual antenna in the array to modify a pointing direction of a combined RF signal from the array (e.g., phased array beam steering).

In a third example, where sensor 106 is configured as a SONAR sensor, transmitter 120 may include an array of acoustic transducers, and controller 104 can similarly operate the array of acoustic transducers (e.g., via phase-shifted control signals, etc.) to achieve a target pointing direction of a combined sound signal emitted by the array (e.g., even if the rotating platform 110 is not rotating, etc.).

In other examples, the pointing direction of sensor(s) 106 can be controlled using a deforming flexible structure (e.g., MEMs, etc.) that can be deformed in response to a control signal from controller 104 to adjust a steering direction of the signals emitted by transmitter 120. Other examples are possible.

Stationary platform 114 may take on any shape or form and may be configured for coupling to various structures, such as to a top of a vehicle for example. Also, the coupling of stationary platform 114 may be carried out via any feasible connector arrangement (e.g., bolts and/or screws). In this way, system 100 could be coupled to a structure so as to be used for various purposes, such as those described herein. In one example, sensor(s) 108 can be coupled to stationary platform 114. In this example, sensor(s) 108 can remain stationary relative to the rotational motion of sensors) 106 (or the otherwise changing beam directions of signals emitted by transmitter 120). In another example, sensor(s) 108 can be mounted to another physical structure different than stationary platform 114.

Rotary link 116 directly or indirectly couples stationary platform 114 to rotating platform 110. To that end, rotary link 116 may take on any shape, form and material that provides for rotation of rotating platform 110 about an axis relative to stationary platform 114. In some examples, rotary link 116 may take the form of a shaft or the like that rotates based on actuation from actuator 112, thereby transferring mechanical forces from actuator 112 to rotating platform 110. In one implementation, rotary link 116 may have a central cavity in which one or more components of system 100 may be disposed. In some examples, rotary link 116 may also provide a communication link for transferring data and/or instructions between stationary platform 114 and rotating platform 110 (and/or components thereon such as sensor(s) 106, etc.).

Housing 118 may take on any shape, form, and material and may be configured to house one or more components of system 100. In one example, housing 118 can be a dome-shaped housing. Further, in some examples, housing 118 may be composed of a material that is at least partially non-transparent, which may allow for blocking of at least some light from entering the interior space of housing 118 and thus help mitigate thermal and noise effects of ambient light on one or more components of system 100. Other configurations of housing 118 are possible as well. In some implementations, housing 118 may be coupled to rotating platform 110 such that housing 118 is configured to rotate about the above-mentioned axis based on rotation of rotating platform 110. In such implementations, sensor(s) 106 may rotate together with housing 118. In other implementations, housing 118 may remain stationary while sensor(s) 106 rotate within housing 118. System 100 could also include multiple housings similar to housing 118 for housing certain sub-systems or combinations of components of system 100. For example, system 100 may include a first housing for sensor(s) 106 and a separate housing for sensor(s) 108. Other examples are possible as well.

Display 140 can optionally be included in system 100 to display information about one or more components of system 100. For example, controller 104 may operate display 140 to display images captured using a camera (e.g., sensor 108), a representation (e.g., 3D point cloud, etc.) of an environment of system 100 indicated by LIDAR data from sensor 106, and/or a representation of the environment based on a combination of the data from sensors 106 and 108 (e.g., colored point cloud, images with superimposed temperature indicators, etc.). To that end, display 140 may include any type of display (e.g., liquid crystal display, LED display, cathode ray tube display, projector, etc.). Further, in some examples, display 140 may have a graphical user interface (GUI) for displaying and/or interacting with images captured by sensor 108, LIDAR data captured using sensor 106, and/or any other information about the various components of system 100 (e.g., power remaining via power supply arrangement 102). For example, a user can manipulate the GUI to adjust a scanning configuration of sensors 106 and/or 108 (e.g., scanning refresh rate, scanning resolution, etc.).

It is noted that the various components of system 100 can be combined or separated into a wide variety of different arrangements. For example, although sensors 106 and 108 are illustrated as separate components, one or more components of sensors 106 and 108 can alternatively be physically implemented within a single device. Thus, this arrangement of system 100 is described for exemplary purposes only and is not meant to be limiting.

Figure 2A:
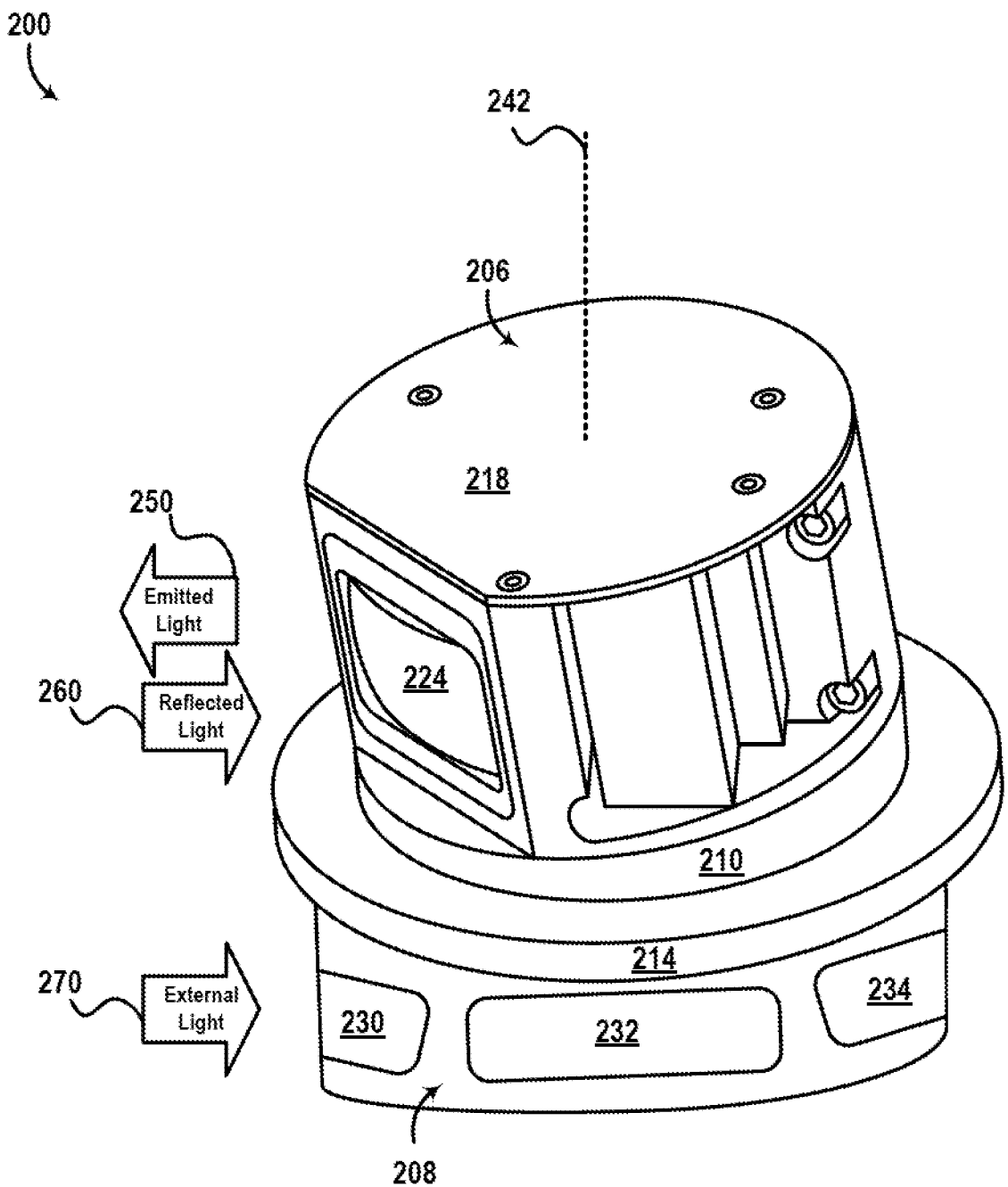
FIG. 2A illustrates a device that includes a rotating LIDAR sensor and a rolling shutter camera arrangement, according to example embodiments.

FIG. 2A illustrates a device 200 that includes a rotating LIDAR sensor 206 and a camera ring 208, according to example embodiments. As shown, device 200 includes a LIDAR 206, camera ring 208 (e.g., arrangement of rolling shutter cameras, etc.), a rotating platform 210, a stationary platform 214, a housing 218, a LIDAR lens 224, and camera lenses 230, 232, 234 which may be similar, respectively, to sensor(s) 106, sensor(s) 108, rotating platform 110, stationary platform 114, housing 118, optical element 124, and optical elements 130, for example.

As shown, light beams 250 emitted by LIDAR 206 propagate from lens 224 along a pointing direction of LIDAR 206 toward an environment of LIDAR 206, and reflect off one or more objects (not shown) in the environment as reflected light 260. Further, as shown, LIDAR 206 may then receive reflected light 290 (e.g., through lens 224). Thus, for instance, LIDAR 206 may provide data (e.g., data point cloud, etc.) indicating distances between the one or more objects and the LIDAR 206 based on detection(s) of the reflected light 290, similarly to the discussion above for sensor 106.

Further, as shown, each camera of camera ring 208 may receive and detect a respective portion of external light 270 incident on the respective camera. To that end, external light 270 may include light originating from one or more external light sources, such as the sun, a street lamp, among other possibilities. For example, external light 270 may include light propagating directly from an external light source toward camera lenses 230, 232, and/or 234. Alternatively or additionally, external light 270 may include light originating from an external light source and reflecting off one or more objects (not shown) in the environment of device 200 before propagating toward lenses 230, 232, and/or 234. Thus, for example, the cameras of camera ring 208 may generate one or more images of the environment based on external light 270. Further, each image generated by a particular camera may correspond to a particular FOV of the particular camera relative to device 200.

To that end, in some examples, camera ring 208 may include a plurality of cameras that are arranged in a ring formation (e.g., circular arrangement, oval arrangement, etc.) relative to one another. Each camera of the plurality can be positioned (e.g., mounted to device 200 and/or camera ring 208) at a particular angle and/or orientation. Thus, for instance, a FOV of a first camera may be adjacent to and/or partially overlapping FOVs of two other adjacent cameras. With this arrangement for instance, images from the individual cameras can be combined into an image of a 360-degree FOV of device 200. Further, during assembly or calibration of device 200 for instance, the respective angle and/or orientation of each camera can be adjusted to reduce or prevent blind spots (e.g., regions of the surrounding environment that are not within the FOV of any camera in camera ring 208). For example, the respective FOVs of two adjacent cameras can be aligned (e.g., by moving, rotating, and/or otherwise adjusting relative mounting positions of the two cameras, etc.) such that a region of the environment between the FOVs of the two cameras (e.g., "blind spot") is less than a threshold distance from device 200.

To facilitate this, in one implementation, camera ring 208 could optionally include a housing (e.g., ring-shaped, etc.) having one or more indentations that receive and/or support the cameras at particular respective mounting positions (e.g., angle, orientation, etc.). In another implementation, an example system (e.g., system 100, a calibration system, etc.) may be configured to compare images captured by the cameras, and to determine, based on the comparison, alignment offsets that achieve respective target FOVs for the respective cameras. The example system may also include and/or operate a robotic arm, an actuator, and/or any other alignment apparatus to adjust the positions of the cameras in camera ring 208 according the determined alignment offsets. Other examples are possible.

In some examples, device 200 (or another computing device coupled thereto) may operate the cameras of camera ring 208 and/or process the captured images therefrom (e.g., combine portions of the captured images, etc.) to form a cohesive circular vision of the environment of device 200. For example, a computing system (not shown) of device 200 or another device may match features in images captured by camera ring 208 to generate a combined image that spans a combination of the FOVs of the cameras.

In one implementation, lens 230 may focus light from a first 90-degree FOV of device 200, lens 232 may focus light from a second adjacent 90-degree FOV, and so on. The first FOV could optionally partially overlap the first FOV. In other implementations, the FOV imaged by each camera may be more or less than 90 degrees. Further, in line with the discussion above, an image captured by any of the cameras in camera ring 208 may indicate various types of information such as light intensities for different wavelengths (e.g., colors, etc.) in external light 270, among other examples.

In some examples LIDAR 206 (and/or housing 218) can be configured to have a substantially cylindrical shape and to rotate about axis 242, based on rotation of rotating platform 210 that supports LIDAR 206 for instance. Further, in some examples, the axis of rotation 242 may be substantially vertical. Thus, for instance, by rotating LIDAR 206 about axis 242, device 200 (and/or a computing system that operates device 200) can determine a three-dimensional map based on data from LIDAR 206) of a 360-degree view of the environment of device 200. Additionally or alternatively, in some examples, device 200 can be configured to tilt the axis of rotation of rotating platform 210 (relative to stationary platform 214), thereby adjusting the FOV of LIDAR 206. For instance, rotating platform 210 may include a tilting platform that tilts in one or more directions.

In some examples, as shown, LIDAR lens 224 can have an optical power to both collimate (and/or direct) emitted light beams 250 toward an environment of LIDAR 206, and focus reflected light 260 received from the environment onto a LIDAR receiver (not shown) of LIDAR 206. In one example, lens 224 has a focal length of approximately 120 mm. Other example focal lengths are possible. By using the same lens 224 to perform both of these functions, instead of a transmit lens for collimating and a receive lens for focusing, advantages with respect to size, cost, and/or complexity can be provided. Alternatively however, LIDAR 206 may include separate transmit and receive lenses. Thus, although not shown, LIDAR 206 can alternatively include a transmit lens that directs emitted light 250 toward the environment, and a separate receive lens that focuses reflected light 260 for detection by a receiver of LIDAR 206.

It is noted that device 200 may include more, fewer, or different components than those shown, and one or more of the components shown may be combined or separated in different ways. In one example, instead of multiple camera lenses 230, 232, 234, device 200 could alternatively include a single camera lens that extends around a circumference of camera ring 208. In another example, although camera ring 208 is shown to be coupled to stationary platform 214, camera ring 208 can alternatively be implemented as a separate physical structure. In yet another example, camera ring 208 can be positioned above LIDAR 206, without being rotated by rotating platform 214. In still another example, camera ring 208 may include more or fewer cameras than shown. Other examples are possible.

Figure 2B:
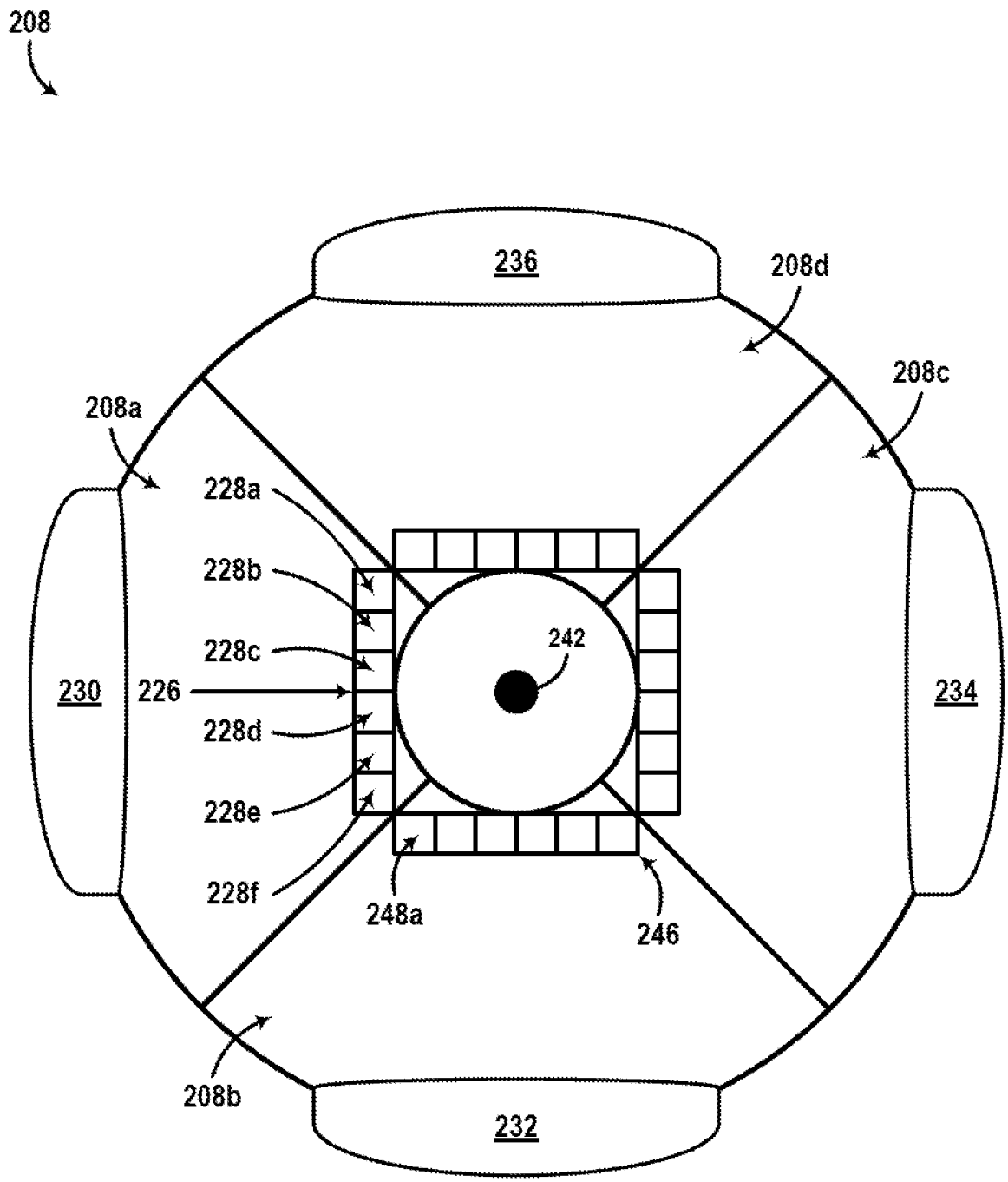
FIG. 2B is a cross-section view of the rolling shutter camera arrangement of FIG. 2A.

FIG. 2B illustrates a cross-section view of camera ring 208, according to an example embodiment. In the cross-section view of FIG. 2B, axis 242 (i.e., axis of rotation of LIDAR 206) extends through the page. As shown, camera ring 208 includes four cameras 208a, 208b, 208c, 208d that are arranged around axis of rotation 242. Thus, in the example shown, each of the cameras may be configured to image a respective 90-degree FOV of the environment of device 200. However, in other embodiments, camera ring 208 may include fewer or more cameras than shown. In one particular embodiment, camera ring 208 may alternatively include eight cameras, where each camera is coupled to a respective lens that focuses light from (at least) a respective 45-degree FOV of the environment onto an image sensor of the camera. Other examples are possible. Thus, camera ring 208 may have a wide variety of different configurations and thus the configuration shown includes four cameras only for convenience in description.

Further, as shown, camera 208a includes lens 230 that focuses a first portion of external light (e.g., light 270) from the environment of device 200 onto an image sensor 226 of camera 208a. Further, as shown, camera 208b includes lens 232 that focuses a second portion of the external light onto an image sensor 246 of camera 232. Similarly, cameras 208c and 208d may be configured to focus respective portions of the external light onto respective image sensors of the cameras.

Further, as shown, each image sensor may include an array of sensing elements similar to sensing elements 128 for example. For instance, image sensor 226 of camera 208a may include an array of adjacent rows of sensing elements, exemplified by sensing elements 228a-228f (which may be similar to sensing elements 128 for example). By way of example, a first row of sensing elements in image sensor 226 may include sensing element 228a and one or more other sensing elements (not shown) that are vertically arranged through the page (e.g., parallel to axis 242). Further, a second row of sensing elements adjacent to the first row may include sensing element 228b and one or more other sensing elements (not shown) that are vertically arranged through the page, and so on.

In this way, for example, cameras 208a, 208b, 208c, 208d may together provide an array of adjacent rows of sensing elements that are arranged around axis 242, so as to be able to image various corresponding portions of a 360-degree (horizontal) FOV around device 200. For instance, a given row of sensing elements in image sensor 246 of camera 204b may include sensing element 248a (and one or more other sensors arranged parallel to axis 242 through the page). Further, in this instance, the given row of sensing elements in camera 208b may also be adjacent to a row of sensing elements in camera 208a that includes sensing element 228f. Thus, in an example scenario, the sequence of image pixels obtained from camera ring 208 may include a row of image pixels obtained using data from the row of sensing elements that includes sensing element 228f followed by a row of image pixels obtained using data from the row of sensing elements that includes sensing element 248a.

It is noted that the number of rows of sensing elements in each of the image sensors (e.g., sensors 226, 246, etc.) is illustrated as shown only for convenience in description. However, in some embodiments, image sensor 226 (and/or 246) may include more or fewer rows of sensing elements than shown. In one particular embodiment, image sensor 226 may alternatively include 3000 rows of sensing elements, and each row may include 1000 sensing elements (extending through the page). In this embodiment, camera 208a may thus be configured to output a 3000×1000 pixel image. Further, in this embodiment, camera 208a may be configured to capture images at a rate of 60 Hz. Other camera configuration parameters are possible as well.

It is noted that the sizes, shapes, and positions of the various components of device 200 are not necessarily to scale, but are illustrated as shown only for convenience in description. In one example, the sizes of the lenses 230, 232, 234, 236, and sensors 226, 246, etc., shown in FIG. 2B may be different than the sizes shown. In another example, the distance between lens 230 and image sensor 226 may be different than the distance shown. In one embodiment, the distance from lens 230 to sensor 226 may correspond to approximately twice the diameter of lens 230. However, in other embodiments, image sensor 226 and camera lens 230 may have other sizes, shapes, and/or positions relative to one another.

Figure 2C:
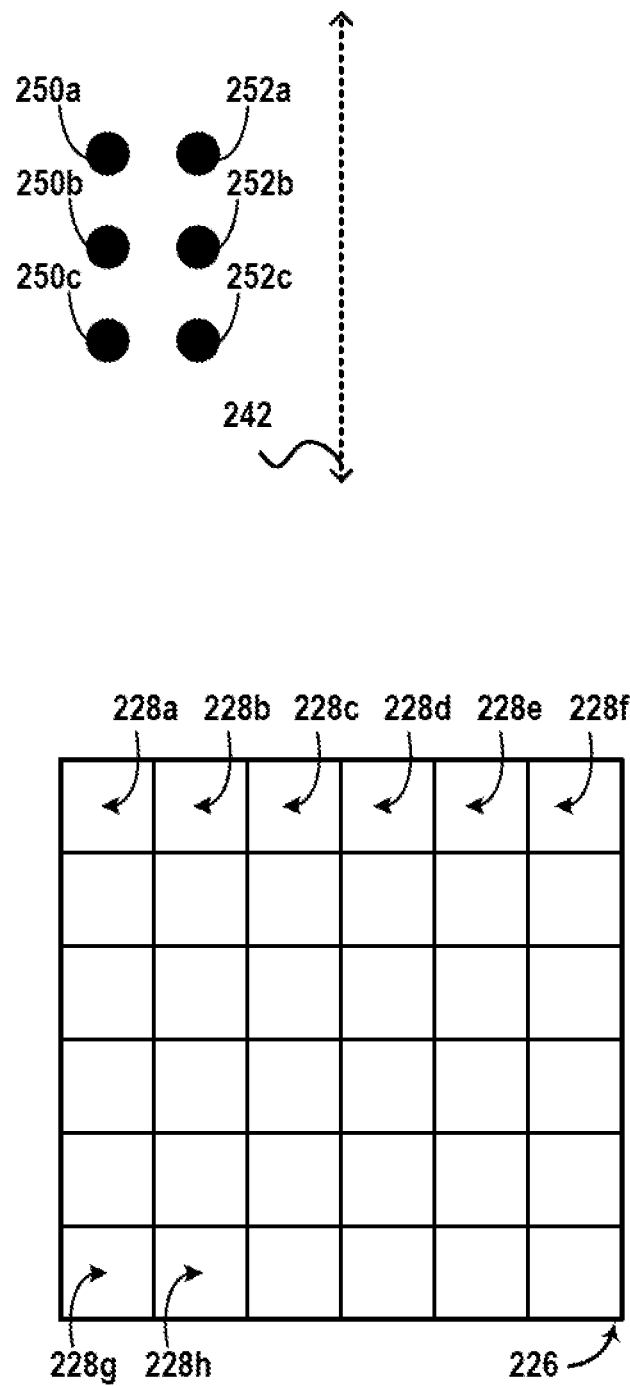
FIG. 2C is a conceptual illustration of an operation of the device of FIG. 2A.

FIG. 2C is a conceptual illustration of an operation of device 200, according to an example embodiment. In the illustration of FIG. 2C, the sensing elements of image sensor 226 of camera 208a are in the plane of the page. It is noted that some of the components of device 200, such as camera lens 230 and LIDAR 206 for instance, are omitted from the illustration of FIG. 2C for convenience in description.

In some implementations, device 200 may be configured to operate cameras 208a, 208b, 208c, and/or 208d in a rolling shutter configuration to obtain a sequence of image pixels. In the scenario of FIG. 2C for example, a first row of sensing elements that includes sensing elements 228a and 228g may be configured to measure an amount of external light incident thereon during a first exposure time period. Device 200 may also include an analog to digital converter (not shown) that reads and converts the measurements by the first row of sensing elements (after the first exposure time period lapses) for transmission to a controller (e.g., controller 104) of device 200. After a time delay from a start time of the first exposure time period (and optionally before the first exposure time period ends), device 200 may start exposing a second row of sensing elements that includes sensing elements 228b and 228h for a second exposure time period. Thus, in some examples, exposure time periods of multiple rows of sensing elements may partially overlap (e.g., the time delay between the start times of the first and second exposure time periods may be less than the first exposure time period, etc.). In this way, a camera in the rolling shutter configuration can stagger the start times of the exposure time periods to increase the image refresh rate (e.g., by simultaneously exposing multiple rows of sensing elements during the overlapping portions of their respective exposure time periods).

Continuing with the scenario, after the second exposure time period lapses, device 200 may then similarly measure and transmit the measurements by the second row of sensing elements to the controller. This process can then be repeated until all the rows of sensing elements (i.e., a complete image frame) are scanned. For example, after a start time of the second exposure time period (and optionally before the second exposure time period lapses), device 200 may begin exposing a third row of sensing elements (adjacent to the second row) to external light 270, and so on.

Further, as noted above, device 200 may be configured to obtain the sequence of image pixels in an order that is similar to the order in which light pulses are emitted by LIDAR 206. By doing so, for instance, more image pixels captured by cameras 208a-d may overlap (in both time and viewing direction) with LIDAR data (e.g., detected reflections of the emitted light pulses) than in an implementation where the sequence of image pixels is obtained in a different order.

Continuing with the scenario of FIG. 2C for example, light beams 250a, 250b, 250c may correspond to the emitted light 250 shown in FIG. 2A when LIDAR 206 is at a first pointing direction or orientation about axis 242. In the scenario, the device 200 may be configured to scan the first (vertical) row of sensing elements (e.g., including elements 228a and 228g) before scanning sensing elements in the second (vertical) row (e.g., including elements 228b and 228h). By doing so, the image pixels captured using the first row of sensing elements may be more likely to be matched with detected reflections of light beams 250a-250c in terms of both time and viewing direction. In the scenario, LIDAR 206 may then rotate (e.g., counterclockwise) about axis 242 and emit light beams 252a-252c. Device 200 may then obtain a second row of image pixels using the second row of sensing elements (e.g., including sensing elements 228b and 228h), which may be more likely to be aligned (in both time and viewing direction) with detected reflections of light beams 252a-252c, and so on.

In some implementations, device 200 may also be configured to obtain a row of image pixels in the sequence according to the order of emission of the light pulses/beams by LIDAR 206. As a variation of the scenario above for example, if LIDAR 206 emits light beams 250a, 250b, 250c in that order, then device 200 may be configured to obtain the image pixel row associated with the first row of sensing elements in a similar order (e.g., beginning with sensing element 228a and ending with sensing element 228g). Whereas, for instance, if LIDAR 206 emits light beams 250c, 250b, 250a in that order, then device 200 may instead be configured to obtain the image pixel row in an opposite order (e.g., beginning with sensing element 228g and ending with sensing element 228a).

Further, in some implementations, device 200 may be configured to adjust a time delay between capturing subsequent image pixel rows in the sequence of image pixels based on a rate of rotation of LIDAR 206. For example, if LIDAR 206 increases its rate of rotation (e.g., via actuator(s) 112, etc.), then device 200 may reduce the time delay between obtaining the first row of image pixels associated with the first row of sensing elements (e.g., including sensing elements 228a and 228g) and obtaining the second row of image pixels associated with the second adjacent row of sensing elements. As noted above, for instance, the exposure start times associated with each row of sensing elements may depend on the order and time of obtaining the corresponding image pixels, and thus adjusting the time delay may improve the extent of matching image pixel capture times (and viewing directions) with corresponding LIDAR pulse emission times (and/or detections of corresponding reflections).

Figure 2D:
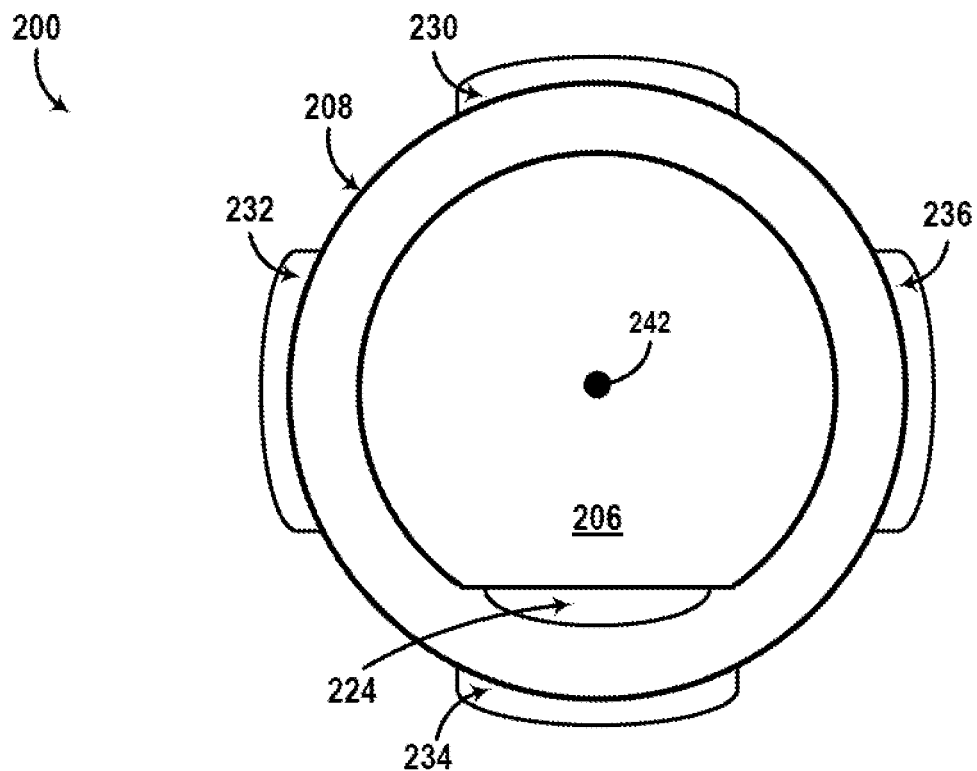
FIG. 2D illustrates a top view of the device of FIG. 2A.

FIG. 2D illustrates a top view of device 200. In the illustration of FIG. 2D, LIDAR 206 may have a first pointing direction that corresponds to an angular position of 0° about axis 242 (e.g., toward the bottom of the page). In this configuration for example, LIDAR 206 may scan a region of the surrounding environment that corresponds to a center of an image captured using camera 208c (best shown in FIG. 2B), which includes lens 234.

Figure 2E:
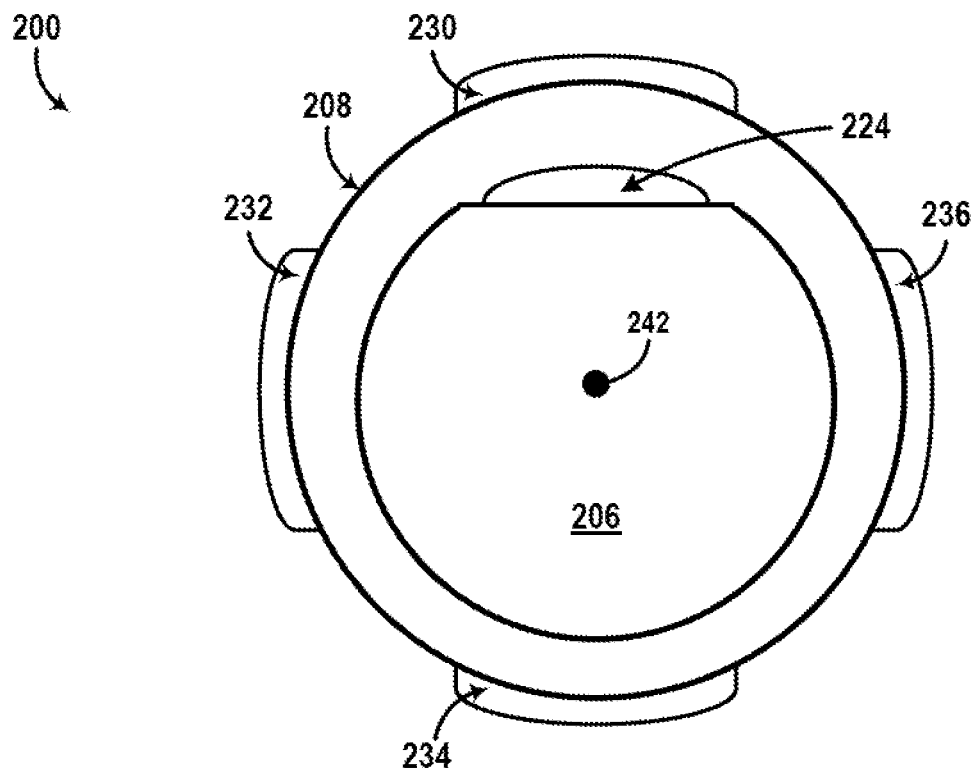
FIG. 2E illustrates another top view of the device of FIG. 2A.

FIG. 2E illustrates another top view of device 200. In the illustration of FIG. 2E, LIDAR 206 may have a second pointing direction that corresponds to an angular position of 180° about axis 242 (e.g., toward the top of the page). For instance, LIDAR 206 may have the second pointing direction of FIG. 2E after LIDAR 206 is rotated from the first pointing direction of FIG. 2D by half a complete rotation about axis 242. Further, in this configuration for example, LIDAR 206 may scan a region of the environment that corresponds to a center of an image captured using camera 208a (best shown in FIG. 2B), which includes lens 230.

In some scenarios, as LIDAR 206 rotates about axis 242, the time period in which FOVs of LIDAR 206 overlap the FOV of camera 208a may be less than the exposure time period (and readout time period) suitable for capturing an image using camera 208a.

In one example scenario, where camera 208a is operated in a rolling shutter configuration (e.g., rows of sensing elements in camera 208a exposed according to different exposure start times), image sensor 226 of camera 208a may measure and output an image frame (i.e., pixel data from all the sensing elements of image sensor 226) over a period of 60 ms. Further, in the scenario, LIDAR 206 may be configured to rotate at a rotation rate of 10 Hz (i.e., one complete rotation about axis 242 every 100 ms). Thus, LIDAR 206 may scan a range of FOVs that overlap an FOV of camera 208a within a time period of 100 ms/4=25 ms (e.g., from t=37.5 ms to t=62.5 ms). To account for the difference between the scanning durations of the camera and the LIDAR, in some implementations, device 200 may be configured to synchronize LIDAR light pulses emitted by LIDAR 206 with image pixels captured by some but not all the image sensing elements in a camera.

For example, device 200 can be configured to trigger capturing an image by a particular camera such that a particular region of the image (e.g., vertical row(s) of image pixels at or near the center of the image, etc.) is exposed to external light when LIDAR 206 is pointing at a particular pointing direction aligned with the particular region of the image.

Continuing with the scenario above for instance (where LIDAR 206 rotates at a frequency of 10 Hz), at time t=0 ms, LIDAR 206 (as shown in FIG. 2D) may have a first pointing direction (e.g., angular position about axis 242=0°). Further, at time t=50 ms, LIDAR 206 (as shown in FIG. 2E) may have a second pointing direction (e.g., angular position about axis 242=180°).

In this scenario, device 200 may be configured to synchronize a center of the exposure time period of image sensor 226 (inside camera 208a) with the time (e.g., t=50 ms) at which the FOV of LIDAR 206 overlaps the center of the FOV of camera 208a. For example, where the exposure time period of image sensor 226 is 60 ms, then at time t=30 ms the center vertical rows of sensing elements in image sensor 226 may be exposed to external light. In this example, camera 208a may trigger an image capture at time t=50−30=20 ms to align (in both the time domain and space domain) exposure of vertical row(s) of sensing elements near the center of image sensor 226 with the LIDAR light pulses emitted when LIDAR 206 is scanning a FOV that corresponds to the center of the image (e.g., at t=50 ms).

With this arrangement, image pixels near the center of the image (e.g., captured using the vertical row including sensing element 228c, or the row including sensing element 228*d*) may be relatively more aligned (with respect to timing and viewing direction) with LIDAR light pulses that were emitted/detected when these image pixels were measured. On the other hand, image pixels captured using rows of sensing elements that are further from the center of the image sensor may be relatively misaligned (in time or viewing direction) with LIDAR light pulses that were emitted/detected when these image pixels were measured. By way of example, the FOVs of the rotating LIDAR may overlap the camera FOV of camera 208*a* between times t=37.5 ms and t=62.5 ms. In the scenario above however, camera 208*a* may begin exposing the row of sensing elements that include sensing element 228*a* (best shown in FIG. 2C) at time t=20 ms (i.e., outside the range of times when the FOV of the LIDAR overlaps the FOV of the camera).

To mitigate this misalignment, in some examples, cameras 208*a*, 208*b*, 208*c*, 208*d* can be configured to have partially overlapping FOVs. For example, camera 208*d* (best shown in FIG. 2B) may be configured to have a FOV that partially overlaps the FOV of adjacent camera 208*a*. Further, the exposure time period associated with a center region of an image captured using camera 208*d* can be synchronized with the time (e.g., t=25 ms) at which LIDAR 206 is pointing toward a FOV associated with the center of the image captured using camera 208*d*. Thus, in these examples, device 200 (or other computer) can use the aligned image pixel data from camera 208*d* (e.g., image pixels near center of captured image) instead of the misaligned image pixel data captured using camera 208*a* (e.g., image pixels further from the center of the image) for mapping with the LIDAR data.

Figure 3:
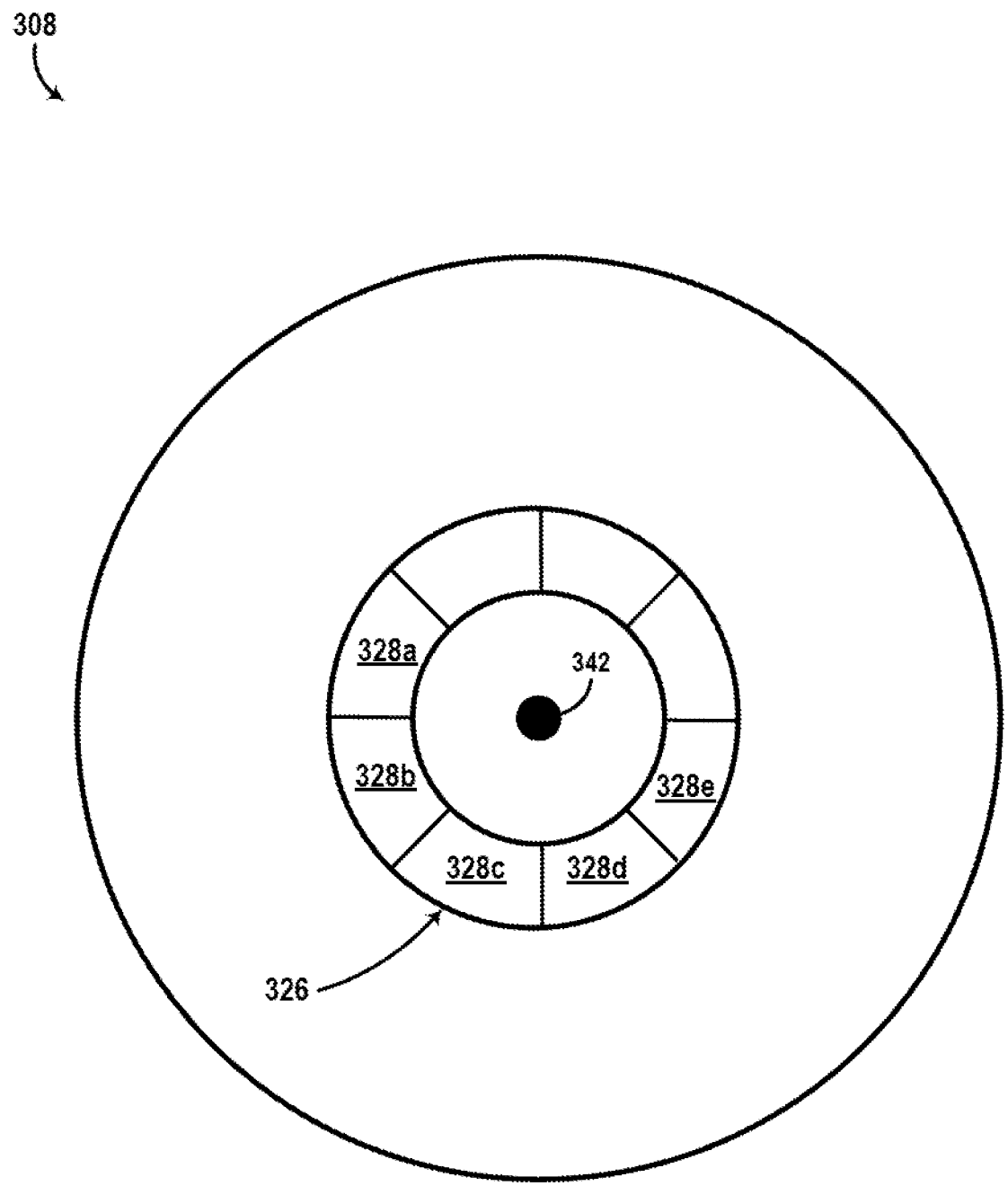
FIG. 3 illustrates a cross-section view of another rolling shutter camera arrangement, according to example embodiments.

FIG. 3 illustrates a cross-section view of another rolling shutter camera arrangement 308 (e.g., camera ring), according to example embodiments. Camera ring 308 may be similar to camera ring 208 shown in FIG. 2B. As shown, for example, axis 342 may be an axis of rotation of a LIDAR similarly to axis 242. Further, for example, image sensor 326 may be similar to image sensor 226 (and/or 246) and may include an array of sensing elements, exemplified by sensing elements 328*a*-328*e*, which may be similar to sensing elements 228*a*-228*f*. For example, image sensor 326 may comprise a first row of sensing elements that includes sensing element 328*a* and one or more other sensing elements (not shown) in a linear arrangement (e.g., perpendicular to the page), and a second adjacent row of sensing elements that includes sensing element 328*b* and one or more other sensing elements (not shown) in a linear arrangement (e.g., perpendicular to the page).

Although not shown, camera ring 308 may also include one or more camera lenses (e.g., similar to camera lenses 230, 232, 234, 236, etc.) that focus portions of external light incident on camera ring 308 toward respective sensing elements in the image sensor 326. Additionally or alternatively, camera ring 308 may include one or more of the components shown in any of system 100 and/or device 200.

As shown, camera ring 308 includes image sensor 326 that is disposed along a curved surface (e.g., circular surface) around axis 342. In one example, image sensor 326 can be implemented on a flexible substrate (e.g., flexible PCB, etc.) that mounts an arrangement of sensing elements (including sensing elements 328*a*-328*e*, etc.). Thus, with this arrangement, each of the rows of sensing elements in image sensor 326 may be at a same given distance to the axis of rotation 342 (e.g., circular or cylindrical arrangement of sensing elements). In another example, image sensor 326 can be implemented as a plurality of physically separate rows of sensing elements that are arranged adjacent to one another around axis of rotation 342. For instance, each physically separate row of sensing elements may be located at a same given distance to the axis of rotation as the other rows. Other examples are possible. Regardless of the implementation, in the configuration of camera ring 308, the curved surface on which each row of sensing elements in image sensor 326 is mounted may improve the overlap (e.g., in terms of viewing direction) between the image pixels captured by the sensing elements and the light beams emitted by a LIDAR sensor that rotates about axis 342.

For instance, as the LIDAR sensor rotates about axis 342, the viewpoint of the LIDAR device (e.g., location of LIDAR lens) may move in a circular path. Thus, with this arrangement, the curved surface of image sensor 326 may resemble the circular path of emitted/detected LIDAR light pulses to improve the likelihood of matching image pixels collected by sensor 326 with LIDAR light pulses (that are detected along a similar curved path in the horizontal direction of the rotation of the LIDAR sensor).

II. EXAMPLE MAPPING OF POINTS INTO ROLLING-SHUTTER IMAGES

It can be beneficial in a variety of applications to map one or more points in an environment (e.g., points detected, relative to an autonomous vehicle, by a LIDAR sensor of the autonomous vehicle) to location(s) (e.g., individual pixels) within an image of a portion of the environment. This can be done in order to generate information about the shape, composition, contents, or other properties of the environment to facilitate navigation through the environment, to inventory contents of the environment, to manipulate contents of the environment, or to facilitate some other goal. For example, the image could be used to identify contents of the environment (e.g., to identify an object of interest). In such an example, mapping a detected point in the environment (e.g., a point of a LIDAR point cloud) to a location, within the image, that represents the identified contents could allow the location, within the environment, of the identified contents to be determined.

Such methods for localizing a point in an environment to a location in an image of a portion of the environment could be part of a sensor fusion algorithm. Sensor fusion algorithms can be employed to merge data from multiple sensors, such as an image sensor and a LIDAR sensor for instance, to generate a representation of a scanned environment. For instance, a 3D representation of a scanned environment may indicate color information determined using an image sensor combined with other information (e.g., distance, depth, intensity, texture, reflected light pulse length, etc.) determined using a LIDAR sensor.

A variety of methods could be employed to map a point in an environment to a location within an image of the environment. These methods generally use information about the location and orientation, or 'pose,' within the environment of the camera that generated the image. In examples where the camera is in motion relative to the environment (e.g., where the camera is part of an automobile, an unmanned aerial vehicle, or some other autonomous or otherwise-configured vehicle), it is desirable to determine the pose of the camera within the environment at the particular period of time when the camera generated the image.

Figure 4A:
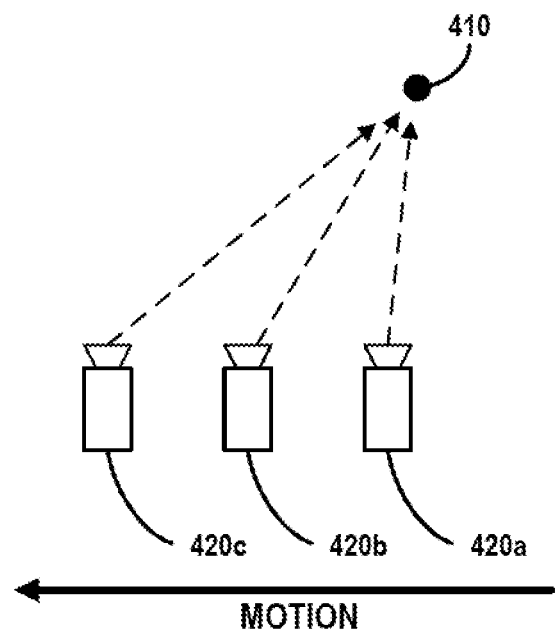
FIG. 4A illustrates the motion of a camera relative to a point in an environment.

FIG. 4A illustrates an example point 410 in an environment (e.g., a point that is part of a point cloud generated through the operation of a LIDAR sensor). A camera is also present in the environment and is operable to image a portion of the environment, e.g., a portion that contains the example point 410. The camera is in motion (the direction of motion indicated in FIG. 4A, by the arrow labeled "MOTION"). The location of the camera at first, second, and third points in time is illustrated, in FIG. 4A, by the first 420*a*, second 420*b*, and third 420*c* cameras.

The direction from the camera to the example point 410 at each of the points in time is illustrated, in FIG. 4A, by the dashed-line arrows. Since the camera is in motion, the direction from the camera to the example point 410, relative to the orientation of the camera, changes over time. Accordingly, the location of the example point 410, within an image of the environment taken by the camera, will be dependent on the time at which the camera generated the image and/or the time at which the camera generated the portion of the image that represents light received from contents of the environment at the example point 410.

Figure 4B:
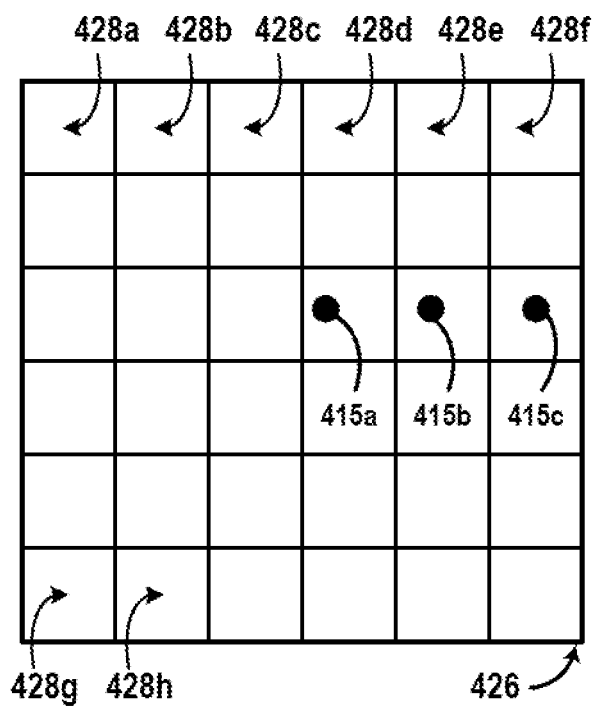
FIG. 4B illustrates the projection of the point illustrated in FIG. 4A onto an image generated by the camera illustrated in FIG. 4A.

FIG. 4B is a conceptual illustration of sensing elements 428*a-h* (e.g., CMOS light sensitive elements, pixels of a CCD sensor) of an image sensor 426 of the in-motion camera illustrated in FIG. 4A. A lens, aperture, and/or or other elements of the camera project light received from the environment from different trajectories to respective different locations on the image sensor 426. Accordingly, the example point 410 will be represented within an image generated by the camera at a location that is dependent upon when the camera sensed light from the example point 410. So, for example, if the camera 420*a* generated an image by sensing light from the example point 410 at the first point in time, the example point 410 will be mapped to a first location 415*a* (e.g., a first pixel) within the image. In another example, if the camera 420*a* generated an image by sensing light from the example point 410 at the second point in time, the example point 410 will be mapped to a second location 415*b* (e.g., a second pixel) within the image. In yet another example, if the camera 420*c* generated an image by sensing light from the example point 410 at the third point in time, the example point 410 will be mapped to a third location 415*c* (e.g., a third pixel) within the image.

In examples wherein the camera acts according to a "global shutter" mode or otherwise operates to generate the entire image at substantially the same time (e.g., during a single exposure period), locating a point in an environment (e.g., 410) within the frame of the image may be relatively straightforward. For example, the location and orientation of the camera, relative to the point, at the point(s) in time when the image was generated could be determined and used to project the point into the image.

However, the process of projecting the point in to the image can be more complex when different portions of the image are generated at respective different points in time, e.g., if the camera is operated in a 'rolling shutter' mode. In such an operational mode, each row or column of pixels (or other light-sensitive elements of the camera) is operated during a respective different exposure time to sense light from the environment.

For example, a first row of sensing elements that includes sensing elements 428*a* and 428*g* may be configured to measure an amount of external light incident thereon during a first exposure time period. The camera may also include an analog to digital converter (not shown) that reads and converts the measurements by the first row of sensing elements (after the first exposure time period lapses) for transmission to a controller (e.g., controller 104). After a time delay from a start time of the first exposure time period (and optionally before the first exposure time period ends), the camera may start exposing a second row of sensing elements that includes sensing elements 528*b* and 528*h* for a second exposure time period.

Thus, different portions (e.g., rows/columns of pixels) of an image generated in such a manner represent light sensed by the camera during respective different periods of time. Accordingly, motion of the camera during image acquisition will result in the camera having a different pose, relative to the environment, during acquisition of each of the portions (rows/columns) of the image. It may therefore be necessary to determine which of a number of different poses to use in order to project a point from the environment (e.g., 410) to a location within the image.

A variety of methods are possible to perform this projection and/or pose selection. In some examples, a camera pose could be determined for each of the exposure times (e.g., for each row and/or column) and used to project the point to a respective potential location within the image. Based on the plurality of projections, a particular one of the projections could be selected as the estimated projection of the point into the image. For example, a difference could be determined, for each of the potential locations, between the time of the pose used to generate the projection and the time that the camera imaged the row/column at the projected location within the image. In such an example, the projection corresponding to the lowest-magnitude difference could be selected as the estimated projection of the point into the image.

Such a method, however, includes determining a large number of camera poses and projections, using the poses, of the point into the frame of the image. This may be computationally expensive (e.g., in terms of processor cycles, memory use, data bus use), energetically expensive (e.g., in terms of system energy used to compute the poses, projections, or other calculations), expensive in terms of time used to generate an output, or otherwise unfavorable. Accordingly, such a brute-force method may be undesirable or unworkable in applications, such as autonomous vehicle mapping, localization, and/or navigation applications, that are constrained with respect to power, computational resources, latency/time budget, or other factors and/or applications wherein such a mapping much be performed for a great many points (e.g., for each point in a point cloud generated by a LIDAR sensor).

The methods described herein allow for lower-cost, lower-latency determination of the location, within an image of a portion of an environment, of a corresponding point located within the environment (e.g., a point from a LIDAR point cloud). These methods achieve these improvements by posing the location-estimation problem as a time-estimation problem. In particular, these methods estimate the time (e.g., the particular exposure time of a row/column of a rolling shutter image) at which light from the point in the environment was sensed by a camera when generating the image of the environment into which the point is to be projected.

By posing the problem as one of time estimation, the method can be applied iteratively. A cost function can be determined for each time estimate and used to update the time estimate (e.g., based on a magnitude and/or sign of the cost function, of a residual of the cost function). Such a cost function could include a difference between a first term that is related to the estimated time (e.g., a first term that is equal to the estimated time, defined relative to a reference time) and a second term that is based on a mapping from a projected location, within the image of the point in the environment to a time that the camera sensed light represented at the projected location within the image. This second term can be determined by, e.g., (i) using a determined pose of the camera at the estimated time to project the point in the environment to a location within the image taken by the camera and (ii) determining a time that the camera sensed light, from the environment, at the projected location within the image (e.g., the time at which the row/column of pixels at the projected location was exposed).

In practice, convergence of the estimate occurs in relatively few iterations (e.g., two to three iterations), resulting in the performance of relatively few pose extrapolations/interpolations, point projections, or other computationally expensive tasks. Accordingly, these methods allow for the projection of a point in an environment to a corresponding location within an image of a portion of the environment using relatively less computational resources, power, and/or time when compared with alternative (e.g., brute force) methods.

The cost function term related to the estimated time and the term related to the time that the camera sensed light represented at the projected location within the image may be defined relative to different reference times/epochs. For example, the first term related to the estimated time could be based on the estimated time as defined relative to a time of an anchor pose of the camera and the second term related to the time that the camera sensed light represented at the projected location within the image could be based on a characteristic time of capture of the image (e.g., a timing of a first, middle, or end exposure time of a series of rolling shutter exposure times, a timing of exposure of a principal point within the image). In such examples, the cost function could include an additional term related to the offset between the difference between the time references of the first and second terms of the cost function.

An example of such a cost function is:

$$t_h - \text{IndexToTime}(Z_n(t_h)) + t_{offset}$$

$t_h$ is the estimated time that light from the point in the environment (e.g., 410) was imaged to generate a corresponding portion of the image of the environment, defined relative to a time, $t_{pose}$, of an anchor pose used to determine the pose of the camera at a given estimated time. $Z_n(t_h)$ is the location, within the image, to which the location of the point in the environment is projected when using the pose of the camera as estimated at the estimated time $t_h$. The function IndexToTime( ) takes as an input a location within the frame of a rolling-shutter image and outputs a time, relative to a characteristic time $t_{principal\_point}$ of the image, that light represented by the row or column of pixels at the input location was sensed (e.g., an exposure time of the row/column of pixels). The offset term, $t_{offset}$, represents a time difference between the different zero times/epochs of $t_h$ and IndexToTime( ). So, in this example, $t_{offset}$ could be a static value equal to $t_{pose} - t_{principal\_point}$.

IndexToTime( ) could provide a discontinuous output, e.g., an output time that is one of an enumerated set of output times corresponding to the set of exposure times of the rolling-shutter operation of the camera. Alternatively. IndexToTime( ) could provide a continuous output, e.g., a linearized time that represents a linearized version of the enumerated set of output times corresponding to the set of exposure times of the rolling-shutter operation of the camera.

To determine an estimated time, an initial estimated time is determined and the cost function iteratively applied to generate an output estimated time. This could include performing the iterative process a set number of times, e.g., between 2 and four times, inclusive. Alternatively, the absolute or relative (e.g., relative to the magnitude of the most recent estimated time) reduction in the cost function from one iteration to the next could be assessed (e.g., compared to a threshold value) and used to determine whether the estimated time has converged. Such a threshold-based update process could be constrained to occur no more than a set threshold number of times, e.g., the update process could terminate due to the cost function converging (e.g., the cost function having been reduced in magnitude by less than a threshold amount) or due to the update process having been performed the threshold number of times. Once the iterative process has terminated, the output estimated time can be used to determine a projected location, within the image, of the point in the environment. This can be done by repeating some of the processes employed in the iterative time estimation process (e.g., using the output estimated time to determine a pose, at the output time, of the camera and using the determined pose to project the point in the environment to a location within the image).

Updating the estimated time based on the cost function could include applying the output of the cost function (e.g., a residual determined by evaluating the cost function) to the estimated time in order to update the estimated time. The output of the cost function could be applied directly, or could be normalized. For example, a Jacobian of the cost function, with respect to the estimated time, could be used to normalize the output of the cost function before applying the output of the cost function to update the estimated time. Such a Jacobian could be determined analytically, using a derivative of one or more terms of the cost function, and/or by a process of numerical estimation.

The location, within the image, to which the location of the point in the environment is projected when using the pose of the camera as estimated at the estimated time $t_h$ ($Z_n(t_h)$ in the example cost function above) may be calculated in a variety of ways. For example, $Z_n(t)$ could be a normalized location within the frame of the image. An example of such a calculation is:

$$Z_n(t) = \frac{-1}{r_f^{cam}(t)[0]} \begin{bmatrix} r_f^{cam}(t)[1] \\ r_f^{cam}(t)[2] \end{bmatrix}$$

$$r_f^{cam}(t) = proj(r_f^n, T_{cam}^n(t))$$

$T_{cam}{}^n(t)$ is the pose of the camera at time t, $r_f{}^n$ is the point in the environment to be projected into the image, and proj(x,y) projects a point x into the frame of view of a pose is the point in the environment to be projected into the image, and proj(x,Y) projects a point x into the frame of view of a pose Y.

The pose of the camera at a particular time can be determined from one or more anchor poses and respective one or more points in time. An anchor pose may be determined based on global positioning data, magnetometer data, image data, wheel rotation data, LIDAR data, or some other information related to the location of the camera. Such pose data could be determined for the vehicle as a whole and then converted (e.g., by applying an offset translation and rotation) to arrive at the pose of the camera. In some examples, where the time of a known anchor pose is sufficiently close to the time for which the camera pose is desired, the anchor pose could be applied without modification. However, to improve accuracy, the anchor pose could be extrapolated and/or interpolated to the time of interest. For example, the pose for the camera at a particular time, t, $T_{cam}{}^n(t)$, could be determined by a process of interpolation from a known anchor pose of the camera at a different time, $t_{pose}$. An example of such a calculation is:

$$T_{cam}^n(t) = \text{ExtrapolatePose}(T_{cam}^n(t_{pose}), t)$$

$T_{cam}^n(t_{pose})$ is pose information for the camera, at the anchor pose time $t_{pose}$, that includes the location and orientation of the camera as well as information about the motion of the camera, e.g., the translational and/or rotational velocity of the camera. Such an extrapolation could be performed in a variety of ways. An example of such an extrapolation is:

$$r_{ram}^n(t) = r_{cam}^n(t_{pose}) + (v_{cam}^n \cdot t)$$

$$R_{cam}^n(t) = (1 - \text{Skew}(\omega_{cam}^n) \cdot t) \cdot R_{cam}^n(t_{pose})$$

$R_{cam}^n(t_{pose})$ is the orientation of the camera at the anchor pose time $t_{pose}$, $r_{cam}^n(t_{pose})$ is the location of the camera at $t_{pose}$, $v_{cam}^n$ is the translational velocity of the camera at $t_{pose}$, and $\omega_{cam}^n$ is the rotational velocity of the camera at $t_{pose}$. In some examples, it may be sufficient to extrapolate the pose based only on the translational velocity of the camera, e.g., in examples where the rotational velocity of the camera is relatively low-magnitude.

Additionally or alternatively, the pose of the camera for a particular time could be determined by interpolating multiple different known poses of the camera at respective different known points in time. This could include linear interpolation between two known poses (e.g., two known poses corresponding to respective times that are respectively before and after the time for which an interpolated pose is desired), nonlinear interpolation using more than two poses, or some other interpolation process.

In some examples, the determined and/or detected location of the point in the environment could be moving over time. For example, the point could be the detected location of a moving object in the environment, and the translational velocity, rotational velocity, or other motion information about the moving object could also be detected. In such examples, the embodiments described herein could be modified to account for motion of the point within the environment over time. For example, $r_f^n(t)$ could represent the location of the location of the point in the environment over time (as a function of time t). This time-dependent $r_f^n(t)$ could replace the static $r_f^n$ in the example embodiments described above. Such a time-dependent location could be determined in a variety of ways, e.g., by extrapolating the location of the point from a location and velocity of the point detected at a single detection time (e.g., based on a location $r_f^n(t_{detect})$ and a velocity $v_f^n(t_{detect})$ of the point detected at time $t_{detect}$), by interpolating the location of the point between two different locations detected at two different times, or by using some other method to estimate the location of the point in the environment as a function of time.

III. EXAMPLE METHODS AND COMMUTER READABLE MEDIA

Figure 5:
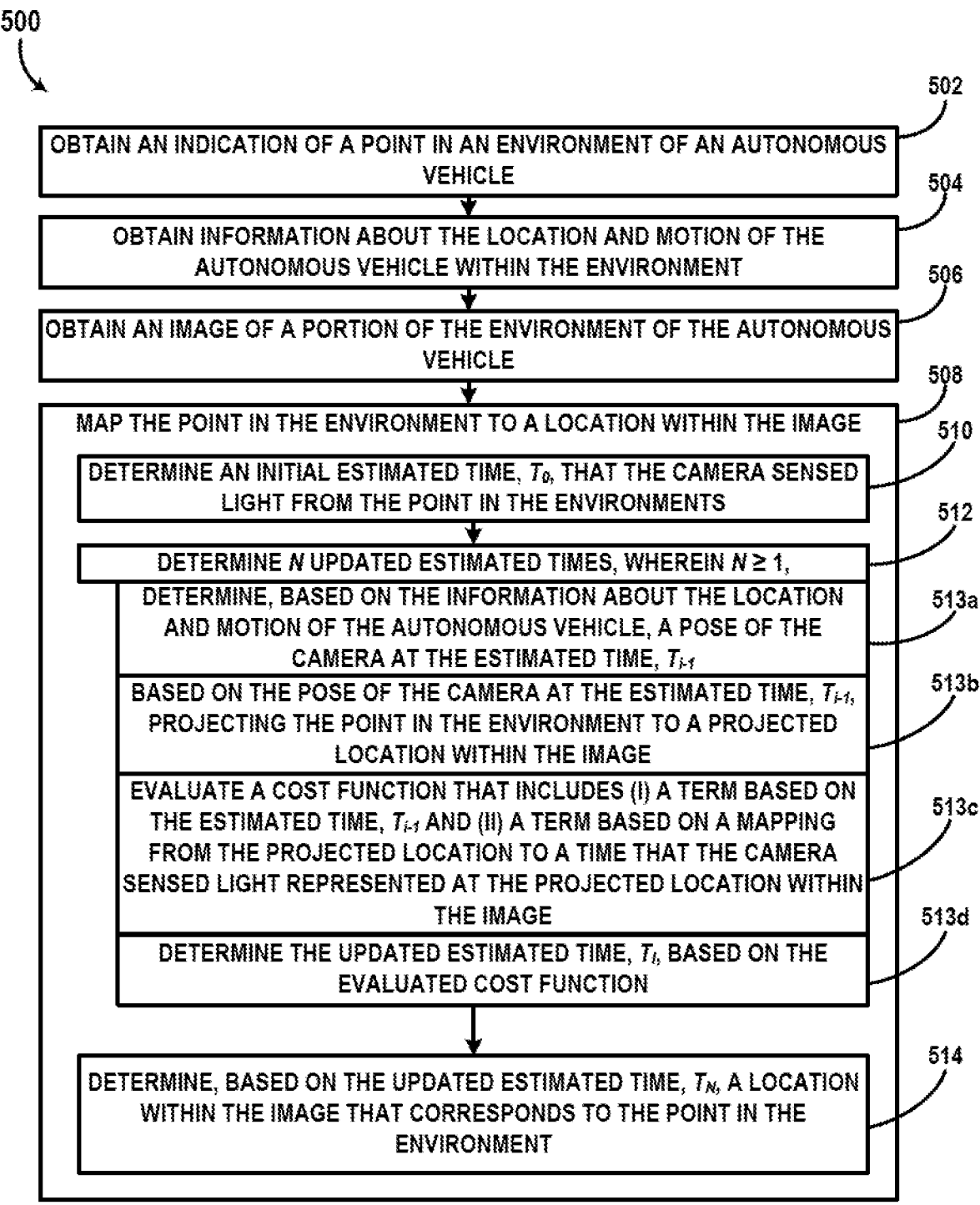
FIG. 5 is a flowchart of a method, according to example embodiments.

FIG. 5 is a flowchart of a method 500, according to example embodiments. Method 500 presents an embodiment of a method that could be used with any of system 100, device 200, and/or camera ring 308, for example. Method 500 may include one or more operations, functions, or actions as illustrated by one or more of blocks 502-514. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 400 and other processes and methods disclosed herein each block in FIG. 4 may represent circuitry that is wired to perform the specific logical functions in the process.

At block 502, method 500 involves obtaining an indication of a point in an environment of an autonomous vehicle. For example, LIDAR sensor 206 may be operated to generate a plurality of LIDAR points related to the location, shape, size or other information about one or more objects in the environment of LIDAR sensor 206 and the indication of the point in the environment could be determined from one or more of the LIDAR points.

At block 504, method 500 involves obtaining information about the location and motion of the autonomous vehicle within the environment. For example information from a GPS, GLONASS, or other navigational positional receiver, LIDAR data, wheel speed/rotation data, inertial data from one or more accelerometers and/or gyroscopes, magnetic field data from a magnetometer, image data about an environment from one or more cameras, or other information related to the location of the autonomous vehicle could be used to generate information about the location and motion of the autonomous vehicle within the environment. This could include performing sensor fusion, applying a filter (e.g., a Kalman filter) to estimates of the motion/location of the autonomous vehicle, or other processes to determine an accurate estimate of the location and motion of the autonomous vehicle within the environment.

At block 506 the method 500 involves obtaining an image of a portion of the environment of the autonomous vehicle. The image includes a plurality of rows of pixels. The image was generated by a camera operating in a rolling shutter mode such that each row of pixels represents light sensed by the camera during a respective exposure time period.

At block 508 the method 500 involves mapping the point in the environment to a location within the image. Mapping the point in the environment to a location within the image involves, at block 510, determining an initial estimated time, $T_0$, that the camera sensed light from the point in the environment. This could include setting the initial estimated time according to a characteristic time of generation of the image (e.g., a time at which the rolling-shutter process began or ended, a time at which a 'middle' set of pixels of the image was exposed). Mapping the point in the environment to a location within the image also involves, at block 512, determining N updated estimated times, wherein N≥1. Mapping the point in the environment to a location within the image also involves, at block 514, determining, based on the updated estimated time, $T_N$, a location within the image that corresponds to the point in the environment.

Determining N updated estimated times involves determining each updated estimated time, $T_i$, by an update process that includes, at block 513a, determining, based on the information about the location and motion of the autonomous vehicle, a pose of the camera at the estimated time, $T_{i-1}$. The update process additionally includes, at block 513b, based on the pose of the camera at the estimated time, $T_{i-1}$, projecting the point in the environment to a projected location within the image. This could include determining the pose of the camera at the estimated time, $T_{i-1}$, by interpolating between the obtained location and motion of the autonomous vehicle and one or more additional locations and motions of the autonomous vehicle, extrapolating the obtained location and motion of the autonomous vehicle to the estimated time, or by performing some additional or alternatively process.

The update process also includes, at block 513c, evaluating a cost function that includes (i) a term based on the estimated time, $T_{i-1}$ and (ii) a term based on a mapping from the projected location to a time that the camera sensed light represented at the projected location within the image. These terms could defined with respect to the same or different 'zero' times or epochs. For example, the term based on the estimated time could be defined relative to a time of the information about the location and motion of the autonomous vehicle and the term based on the mapping from the projected location to the time that the camera sensed light represented at the projected location within the image could be defined relative to a characteristic time of generation of the image (e.g., a time at which the rolling-shutter process began or ended, a time at which a 'middle' set of pixels of the image was exposed). In such examples where the terms are defined relative to different 'zero' times or epochs, the cost function could additional include an offset term to compensate for such differences.

The update process yet further includes, at block 513d, determining the updated estimated time, $T_i$, based on the evaluated cost function. The update process could be performed a pre-determined number of times, e.g., two, three, or four times. Alternatively, the update process could include performing the update process until the time estimate converges, e.g., until an absolute or relative change in the magnitude of the time estimate, form one update to the next, is less than a specified threshold level.

In some implementations, method 500 involves determining a three-dimensional (3D) representation of the environment based on position data (e.g., data from a LIDAR sensor) and image information from the image (e.g., one or more pixels of the image). For example, an example system may combine LIDAR-based information (e.g., distances to one or more objects in the environment, etc.) with camera-based information (e.g., color, etc.) to generate the 3D representation. Other types of representations (e.g., 2D image, image with tags, enhanced image that indicates shading or texture information, etc.) based on a combination of location and image data are possible. Thus, in some implementations, method 500 involves determining a representation of the environment based on color information indicated by the image and point location information (e.g., distance, depth, texture, reflectivity, absorbance, reflective light pulse length, etc.) indicated by, e.g., a LIDAR sensor.

In a first example, a system of method 400 may determine depth information for one or more image pixels in the image based on the point in an environment. For instance, the system can assign a depth value for image pixels in the image. Additionally, for instance, the system can generate (e.g., via display 140) a 3D object data model (e.g., a 3D rendering) of one or more objects in the environment (e.g., colored 3D model that indicates 3D features in the environment, etc.). In another instance, an image processing system can identify and distinguish between multiple objects in the image by comparing depth information (indicated by the associated location of the point in the environment) of the respective objects. Other applications are possible. Thus, in some implementations method 500 involves mapping LIDAR data points collected using the LIDAR sensor to image pixels collected using the one or more cameras. For instance, the LIDAR data can be mapped to a coordinate system of an image output by an image sensor or camera.

In a second example, a system of method 500 may assign colors (based on data from the one or more cameras) to the point in the environment or to other known points in the environment (e.g., to individual points in a LIDAR point cloud). The example system can then generate (e.g., via display 140) a 3D rendering of the scanned environment that indicate distances to features in the environment along with color (e.g., colored point cloud, etc.) information indicated by the image sensor(s) of the one or more cameras. Thus, in some implementations, method 500 involves mapping image pixels from the image to corresponding LIDAR or otherwise-generated location data points. For instance, the image pixel data can be mapped to a coordinate system of LIDAR data output by a LIDAR sensor.

The method 500 may include additional or alternative elements. For example, the 500 could include operating an autonomous vehicle (e.g., steering the vehicle, actuating a throttle of the vehicle, controlling a torque and/or rotation output of one or more wheels, motors, engines, or other elements of the vehicle) based on the mapping of the point in the environment of the vehicle to a location (e.g., a pixel) within the image. This could include using the mapping to identify and/or locate one or more objects or other contents of the environment. Additionally or alternatively, this could include using the mapping to determine a navigational plan and/or determining a command to use to operate the autonomous vehicle.

IV. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

V. Example Implementation

```
// Filename: BUILD
// Copyright (c) 2019 Waymo LLC. All rights reserved.
cc_library(
    name="camera_model",
    srcs=["camera_model.cc"],
    hdrs=["camera_model.h"],
    deps=[
        "//waymo_open_dataset:dataset_cc_proto",
        "//waymo_open_dataset/common:integral_types",
        "//waymo_open_dataset/math:vec2d",
        "@com_google_absl//absl/memory",
        "@com_google_absl//absl/types:optional",
        "@com_google_glog//:glog",
        "@eigen_archive//:eigen".
    ].
)
py_library(
    name="py_camera_model_ops".
    srcs=["py_camera_model_ops.py"],
    data=[
        ":camera_model_ops.so".
    ].
)
cc_binary(
    name="camera_model_ops.so".
    srcs=[
        "camera_model_ops.cc",
    ],
    copts=[
        "-pthread",
    ].
    linkshared=1.
    deps=[
        "//third_party/camera:camera_model",
        "//waymo_open_dataset:dataset_cc_proto".
        "@local_config_tf//:libtensorflow_framework",
        "@local_config_tf//:tf_header_lib",
    ],
)
#Tests
cc_test(
    name="camera_model_test",
    srcs=["camera_model_test.cc"].
    deps=[
        ":camera_model",
        #Implicit proto dependency.
        "@com_google_googletest//:gtest".
        "@com_google_googletest/i:gtest_main",
        "@com_google_absl absl/memory",
        "//waymo_open_dataset:dataset_cc_proto".
    ],
)
py_test(
    name="camera_model_ops_test",
    srcs=["camera_model_ops_test.py"],
    python_version="PY3",
    deps=[
        ":py_camera_model_ops",
        #Implicit tensorflow dependency.
        "//waymo_open_dataset:dataset_proto_py_pb2",
    ].
)
// Filename: camera_model.h
// Copyright (c) 2019 Waymo LLC. All rights reserved.
#ifndef WAYMO_OPEN_DATASET_THIRD_PARTY_CAMERA_CAMERA_MODEL_H_
#define WAYMO_OPEN_DATASET_THIRD_PARTY_CAMERA_CAMERA_MODEL_H_
#include<memory>
#include "Eigen/Geometry"
#include "waymo_open_dataset/dataset.pb.h"
namespace waymo {
namespace open_dataset {
// Example usage:
// CameraModel camera_model(calibration);
// camera_model.PrepareProjection(image);
// camera_model.WorldToImage( . . . );
// camera_model.WorldToImage( . . . );
// This class is not threadsafe.
class CameraModel {
    public:
        explicit CameraModel(const CameraCalibration& calibration);
        virtual ~CameraModel( );
        // This function should be called once per image before calling
        // 'WorldToImage'. It pre-computes some projection relevant variables.
        void PrepareProjection(const CameraImage& camera_image);
        // Projects a 3D point in global coordinates into the lens distorted image
        // coordinates (u_d, v_d). These projections are in original image frame (x:
        // image width, y: image height).
        //
        // Returns false if the point is behind the camera or if the coordinates
        // cannot be trusted because the radial distortion is too large. When the
        // point is not within the field of view of the camera, u_d, v_d are still
        // assigned meaningful values. If the point is in front of the camera image
        // plane, actual u_d and v_d values are calculated.
        //
        // If the flag check_image_bounds is true, also returns false if the point is
        // not within the field of view of the camera.
        //
        // It does rolling shutter projection if the camera is not a
        // global shutter camera. To disable rolling shutter projection, override
        // rolling_shutter_direction in the camera calibration.
        // Requires: 'PrepareProjection' is called.
        bool WorldToImage(double x, double y, double z,
            bool check_image_bounds, double*u_d,
            double*v_d) const;
        // Converts a point in the image with a known depth into world coordinates.
        // Similar as 'WorldToImage'. This method also compensates for rolling shutter
        // effect if applicable.
        // Requires: 'PrepareProjection' is called.
```

```
void ImageToWorld(double u_d, double v_d, double
    depth, double*x, double*y,
    double*z) const;
// True if the given image coordinates are within the
    image.
bool InImage(double u, double v) const;
private:
// Projects a point in the 3D camera frame into the
    lens distorted image
// coordinates (u_d, v_d).
//
// Returns false if the point is behind the camera or
    if the coordinates
// cannot be trusted because the radial distortion is
    too large. When the
// point is not within the field of view of the camera,
    u_d, v_d are still
// assigned meaningful values. If the point is in front
    of the camera image
// plane, actual u_d and v_d values are calculated.
//
// If the flag check_image_bounds is true, also
    returns false if the point is
//not within the field of view of the camera.
bool CameraToImage(double x, double y, double z,
    bool check_image_bounds,
    double*u_d, double*v_d) const;
// Similar as 'WorldToImage' but only for global
    shutter.
//Requires: 'PrepareProjection' is called.
bool WorldToImageGlobalShutter(double x, double
    y, double z,
    bool check_image_bounds, double*u_d,
    double*v_d) const;
// Similar as 'ImageToWorld' but only for global
    shutter.
// Requires: 'PrepareProjection' is called.
void    ImageToWorldGlobalShutter(double    u_d,
    double v_d, double depth, double*x, double*y,
    double*z) const;
// Converts lens distorted image coordinates (u_d,
    v_d) to the normalized
// direction (u_n, v_n).
void ImageToDirection(double u_d, double v_d,
    double*u_n, double*v_n) const;
// Converts normalized direction (u_n, v_n) to the
    lens-distorted image
// coordinates (u_d, v_d). Returns false if the radial
    distortion is too high.
// but still sets u_d and v_d to clamped out-of-bounds
    values to get
// directional information.
bool DirectionToImage(double u_n, double v_n,
    double*u_d, double*v_d) const;
// This is a helper function for rolling shutter pro-
    jection.
// It takes the rolling shutter state variable, position
    of landmark in ENU
// frame, estimated time t_h, and computes projected
    feature in normalized
// coordinate frame, the residual and the jacobian.
// If the jacobian is given as nullptr we will skip its
    computation.
bool ComputeResidualAndJacobian(const Eigen::
    Vector3d& n_pos_f, double t_h,
    Eigen::Vector2d* normalized_coord.
    double*residual, double*jacobian) const;
// Forward declaration of an internal state used for
    global shutter projection
// computation.
struct GlobalShutterState;
// Forward declaration of an internal state used for
    rolling shutter
// projection computation.
struct RollingShutterState;
const CameraCalibration calibration_;
std::unique_ptr<RollingShutterState>rolling_ shut-
    ter_state_;
std::
    unique_ptr<GlobalShutterState>global_shutter_
    state_;
};
} // namespace open_dataset
} // namespace waymo
#endif
// Filename: camera_model.cc
// Copyright (c) 2019 Waymo LLC. All rights reserved.
include "third_party/camera/camera_model.h"
#include <math.h>
#include <stddef.h>
#include <memory>
#include <glog/logging.h>
#include "absl/memory/memory.h"
#include "absl/types/optional.h"
#include "Eigen/Geometry"
#include    "waymo_open_dataset/common/integral_
    types.h"
#include "waymo_open_dataset/dataset.pb.h"
#include "waymo_open_dataset/math/vec2d.h"
namespace waymo {
namespace open_dataset {
namespace {
// Bounds on the allowed radial distortion.
constexpr double kMinRadialDistortion=0.8;
constexpr double kMaxRadialDistortion=1.2;
Vec2d GetProjectionCenter(const CameraCalibration&
    calibration) {
    return Vec2d(calibration.intrinsic(2), calibration.in-
        trinsic(3));
}
Eigen::Matrix3d    SkewSymmetric(const    Eigen::
    Vector3d& v) {
    // clang-format off
    Eigen::Matrix3d m;
    m<<0, -v(2), v(1),
        v(2), 0, -v(0),
        -v(1), v(0), 0;
    // clang-format on
    return m;
}
Eigen::Isometry3d    ToEigenTransform(const    Trans-
    form& t) {
    Eigen::Isometry3d out;
    for (int r=0; r<3; r++) {
        for (int c=0; c<4; c++) {
            const int ind=r*4+c;
            out(r, c)=t.transform(ind);
        }
    }
    return out;
}
double GetPixelTimestamp(
    CameraCalibration::RollingShutterReadOutDirec-
        tion readout_direction,
```

```
    double shutter, double camera_trigger_time, double
        camera_readout_done_time,
    int image_width, int image_height, int x, int y) {
  // Please see dataset.proto for an explanation of shutter
      timings.
  const double readout_time=
      camera_readout_done_time−camera_trigger_time−
      shutter;
  // Cameras have a rolling shutter, so each *sensor* row
      is exposed at a
  // slightly different time, starting with the top row and
      ending with the
  // bottom row. Because the sensor itself may be rotated,
      this means that the
  // *image* is captured row-by-row or column-by-col-
      umn, depending on
  I/ 'readout_direction'.
  double seconds_per_col=0.0;
  double seconds_per_row=0.0;
  bool flip_rows=false;
  bool flip_cols=false;
  switch (readout_direction) {
    case CameraCalibration::TOP_TO_BOTTOM:
      seconds_per_row=readout_time/image_height;
      break;
    case CameraCalibration::BOTTOM_TO_TOP:
      seconds_per_row=readout_time/image_height;
      flip_rows=true;
      break;
    case CameraCalibration::LEFT_TO_RIGHT:
      seconds_per_col=readout_time/image_width;
      break;
    case CameraCalibration::RIGHT_TO_LEFT:
      seconds_per_col=readout_time/image_width;
      flip_cols=true;
      break;
    default:
      LOG(FATAL)<<"Should not reach here "<<read-
          out_direction;
  }
  // Final time for this pixel is the initial trigger time+the
      column and row
  // offset (exactly one of these will be non-zero)+half the
      shutter time to
  // get the middle of the exposure.
  return (camera_trigger_time+
      (flip_cols ? (image_width−x):x)*seconds_per_col+
      (flip_rows ? (image_height−y):y)*seconds_per_
          row+
      shutter*0.5);
}
// In normalized camera, undistorts point coordinates via
    iteration.
void IterateUndistortion(const CameraCalibration& cali-
    bration, double u_nd,
    double v_nd, double*u_n, double*v_n) {
  CHECK(u_n);
  CHECK(v_n);
  const double f_u=calibration.intrinsic(0);
  const double f_v=calibration.intrinsic(1);
  const double k1=calibration.intrinsic(4);
  const double k2=calibration.intrinsic(5);
  const double k3=calibration.intrinsic(6); // same as p1 in
      OpenCV.
  const double k4=calibration.intrinsic(7); // same as p2 in
      OpenCV
  const double k5=calibration.intrinsic(8); // same as k3 in
      OpenCV.
  double& u=*u_n;
  double& v=*v_n;
  // Initial guess.
  u=u_nd;
  v=v_nd;
  CHECK_GT(f_u, 0.0);
  CHECK_GT(f_v, 0.0);
  // Minimum required squared delta before terminating.
      Note that it is set in
  // normalized camera coordinates at a fraction of a pixel^2.
      The threshold
  //  should   satisfy   unittest   accuracy   threshold
      kEpsilon=1e-6 even for very
  // slow convergence.
  const double min_delta2=1e-12/(f_u*f_u+f_v*f_v);
  // Iteratively apply the distortion model to undistort the
      image coordinates.
  // Maximum number of iterations when estimating undis-
      torted point.
  constexpr int kMaxNumIterations=20;
  for (int i=0; i<kMaxNumIterations; ++i) {
    const double r2=u*u+v* v;
    const double r4=r2*r2;
    const double r6=r4*r2;
    const double rd=1.0+r2*k1+r4*k2+r6*k5;
    const double u_prev=u;
    const double v_prev=v;
    const    double    u_tangential=2.0*k3*u*v+k4*
        (r2+2.0*u*u);
    const    double    v_tangential=2.0*k4*u*v+k3*
        (r2+2.0*v*v);
    u=(u_nd−u_tangential)/rd;
    v=(v_nd−v_tangential)/rd;
    const double du=u−u_prev;
    const double dv=v−v_prev;
    // Early exit.
    if (du*du+dv*dv<min_delta2) {
      break;
    }
  }
}
} // namespace
// Some naming conventions:
// tfm: transform
// dcm: direction cosine matrix
// xx0: xx frame at pose timestamp
// omega: angular velocity
struct CameraModel::RollingShutterState {
  // Define: t_pose_offset_=t_pose −t_principal_point. In
      seconds.
  double t_pose_offset=0.0;
  // sign*readout time/normalized_coordinate_range.
  // The sign depends on readout direction.
  double readout_time_factor=0.0;
  // sign*readout time/range_in_pixel_space.
  // The sign depends on readout direction.
  double readout_time_factor_pixel=0.0;
  // The principal point image coordinate, in pixels.
  Eigen::Vector2d principal_point;
  // Transformation from camera to ENU at pose time-
      stamp.
  Eigen::Isometry3d n_tfm_cam0;
  // Velocity of camera at ENU frame at pose timestamp.
  Eigen::Vector3d n_vel_cam0;
```

```
// Define: skew_omega=SkewSymmetric(cam_omega_
    cam0).
Eigen::Matrix3d skew_omega;
// Rotation from ENU to camera at pose timestamp.
Eigen::Matrix3d cam0_dcm_n;
//                                         Define:
    skew_omega_dcm=skew_omega*cam0_dcm_n.
Eigen::Matrix3d skew_omega_dcm:
// Whether rolling shutter direction is horizontal.
bool readout_horizontal_direction=false;
};
struct CameraModel::GlobalShutterState {
    // Transformation from camera to ENU at pose time-
        stamp.
    Eigen::Isometry3d n_tfm_cam0;
    // Transformation from ENU to camera at pose time-
        stamp.
    Eigen::Isometry3d cam_tfm_n;
};
CameraModel::CameraModel(const        CameraCalibra-
    tion& calibration)
    : calibration_(calibration) { }
Camera:Model::~Camera:Model( ) { }
void CameraModel::PrepareProjection(const CameraIm-
    age& camera_image) {
    const Eigen::Isometry3d n_tfm_vehicle0=
        ToEigenTransform(camera_image.pose( ));
    const Eigen::Isometry3d vehicle_tfm_cam=
        ToEigenTransform(calibration_.extrinsic( ));
    if (global_shutter_state_==nullptr) {
        global_shutter_state_=absl::
            make_unique<GlobalShutterState>( );
    }
    global_shutter_state_->
        n_tfm_cam0=n_tfm_vehicle0*vehicle_tfm_cam;
    global_shutter_state_->cam_tfm_n=
        global_shutter_state_->n_tfm_cam0.inverse( );
    if (calibration_.rolling_shutter_direction( );
        CameraCalibration::GLOBAL_SHUTTER) {
    return;
}
if (rolling_shutter_state==nullptr) {
    rolling_shutter_state_=
        absl::make_unique<CameraModel::RollingShutter-
            State>( );
}
const                                         double
    readout_time=camera_image.camera_readout_done_time
    ( )-
    camera_image.camera_trigger_time( )-
    camera_image.shutter( );
const Vec2d principal_point_pixel=GetProjectionCenter
    (calibration_);
rolling_shutter_state_->principal_point=
    Eigen::Vector2d{principal_point_pixel.x( ), principal_
        point_pixel.y( )};
const double t_principal_point=GetPixelTimestamp(
    calibration_.rolling_shutter_direction( ), camera_im-
        age.shutter( ),
    camera_image.camera_trigger_time( ),
    camera_image.camera_readout_done_time( ), calibra-
        tion_.width( ),
    calibration_.height( ), principal_point_pixel.x( ),
    principal_point_pixel.y( ));
rolling_shutter_state_->t_pose_offset=
    camera_image.pose_timestamp( )-t_principal_point;
if (calibration_.rolling_shutter_direction( )==
    CameraCalibration::RIGHT_TO_LEFT||
calibration_.rolling_shutter_direction( )==
    CameraCalibration::LEFT_TO_RIGHT) {
rolling_shutter_state_->
    readout_horizontal_direction=true;
} else {
    rolling_shutter_state_-
        >readout_horizontal_direction=false;
}
// Compute readout time factor.
double normalized_coord_range=0;
double range_in_pixel_space=0:
if (rolling_shutter_state_->readout_horizontal_direction)
    {
    double u_n_first=0, v_n=0, u_n_end=0;
    ImageToDirection(0,    0.5*calibration_.height(    ),
        &u_n_first, &v_n);
    ImageToDirection(calibration_.width( ), 0.5*calibra-
        tion_.height( ),
        &u_n_end, &v_n);
    normalized_coord_range=u_n_end −u_n_first;
    range_in_pixel_space=calibration_.width( );
} else {
    double u_n=0, v_n_first=0, v_n_end=0;
    ImageToDirection(0.5*calibration_.width( ), 0, &u_n,
        &v_n_first);
    ImageToDirection(0.5*calibration_.width( ), calibra-
        tion_.height( ), &u_n,
        &v_n_end);
    normalized_coord_range=v_n_end −v_n_first;
    range_in_pixel_space=calibration_.height( );
}
bool readout_reverse_direction=false;
if (calibration_.rolling_shutter_direction( )==
    CameraCalibration::RIGHT_TO_LEFT ||
calibration_.rolling_shutter_direction( )==
    CameraCalibration::BOTTOM_TO_TOP) {
readout_reverse_direction=true;
}
rolling_shutter_state_->readout_time_factor=
    readout_reverse_direction    ?−readout_time/normal-
        ized_coord_range
        :readout_time/normalized_coord_range;
    rolling_shutter_state_->readout_time_factor_pixel=
        readout_reverse_direction          ?−readout_time/
            range_in_pixel_space
        :readout_time/range_in_pixel_space;
rolling_shutter_state_->
    n_tfm_cam0=n_tfm_vehicle0*vehicle_tfm_cam;
const Velocity& velocity=camera_image.velocity( );
// Compute cam_omega_cam0, n_vel_cam0.
const Eigen::Vector3d n_vel_vehicle=
    Eigen::Vector3d{velocity.v_x(    ),    velocity.v_y(    ),
        velocity.v_z( )};
const Eigen::Vector3d vehicle_omega_vehicle=
    Eigen::Vector3d{velocity.w_x(    ),    velocity.w_y(    ),
        velocity.w_z( )};
const Eigen::Vector3d n_omega_vehicle=
    u_tfm_vehicle0.rotation( )*vehicle_omega_vehicle;
const Eigen::Vector3d cam_omega_cam0=
    vehicle_tfm_cam.rotation( ).transpose( )*vehicle_o-
        mega_vehicle;
rolling_shutter_state_->skew_omega=SkewSymmetric
    (cam_omega_cam0);
// Need to compensate velocity lever arm effect.
rolling_shutter_state_->n_vel_cam0=
    n_vel_vehicle+SkewSymmetric(n_omega_vehicle)*
```

```
        n_tfm_vehicle0.rotation( )*
            vehicle_tfm_cam.translation( );
    rolling_shutter_state_-->cam0_dcm_n=
        rolling_shutter_state_->n_tfm_cam0.rotation( ).trans-
            pose( );
    rolling_shutter_state_->skew_omega_dcm=
        -rolling_shutter_state_->
            skew_omega*rolling_shutter_state_->
            cam0_dcm_n;
}
// In this function, we are solving a scalar nonlinear
    optimization problem:
//     Min||t_h    -IndexToTimeFromNormalizedCoord
    (Cam_p_f(t))+t_offset||
// over t_h where t_h is explained below.
// where Cam_p_f(t)=projection(n_p_f, n_tfm_cam(t))
// The timestamps involved in the optimization problem:
// t_capture: The timestamp the rolling shutter camera can
    actually catch the
// point landmark. (this defines which scanline the point
    landmark falls in the
// image).
// t_principal_point: The timestamp of the principal point.
/; t_pose: The timestamp of the anchor pose.
// Now we can define:
// t_offset:=t_pose -t_principal_point.
// t_h:=t_capture -t_pose.
//   IndexToTimeFromNormalizedCoord(normalized_co-
    ord):=t_capture -
// t_principal_point.
// For this optimization problem we have the equality:
//   t_h   -IndexToTimeFromNormalizedCoord(.)+t_off-
    set=0
// This is efficient because it is a 1-dim problem, and
    typically converges in
// 2-3 iterations.
// To get the best performance and factor in the fact that
    our camera has little
// lens distortion, the IndexToTime(.) function is done in
    the normalized
// coordinate space instead of going to the distortion
    space. The testing
// results show that we get sufficiently good results already
    in normalized
// coordinate space.
bool CameraModel::WorldToImage(double x, double y,
    double z,
        bool check_image_bounds, double*u_d,
        double*v_d) const {
    if (calibration_.rolling_shutter_direction( )==
        CameraCalibration::GLOBAL_SHUTTER) {
        return WorldToImageGlobalShutter(x, y, z, check_im-
            age_ bounds, u_d, v_d);
    }
    // The initial guess is the center of the image.
    double t_h=0.;
    const Eigen::Vector3d n_pos_f{x, y, z}:
    size_t iter_num=0;
    // This threshold roughly corresponds to sub-pixel error
        for our camera
    // because the readout time per scan line is in the order of
        1e-5 seconds.
    // Of course this number varies with the image size as
        well.
    constexpr double kThreshold=1e-5; // seconds.
    constexpr size_t kMaxIterNum=4;
    Eigen::Vector2d normalized_coord;
    double residual=2*kThreshold;
    double jacobian=0.;
    while (std::fabs(residual) >kThreshold && iter_num
        <kMaxIterNum) {
        if    (!ComputeResidualAndJacobian(n_pos_f,    t_h,
            &normalized_coord, &residual.
            &jacobian)) {
            return false;
        }
    }
    // Solve for delta t;
    const double delta_t=-residual/jacobian;
    t_h+=delta_t;
    ++iter_num;
    }
    // Get normalized coordinate.
    if (!ComputeResidualAndJacobian(n_pos_f, t_h, &nor-
        malized_coord, &residual,
        /*jacobian=*/nullptr)) {
    return false;
    }
    if(DirectionToImage(normalized_coord(0), normalized_
        coord(1), u_d, v_d))}
        return false;
    }
    // If requested, check if the returned pixel is inside the
        image.
    if (check_image_bounds) {
        return InImage(*u_d, *v_d):
    }
    return true;
}
void CameraModel::ImageToWorld(double u_d, double
    v_d, double depth, double*x,
    double*y, double*z) const {
    if (calibration_.rolling_shutter_direction( )==
    CameraCalibration_RollingShutterReadOutDirection_
        GLOBAL_SHUTTER) {
        ImageToWorldGlobalShutter(u_d, v_d, depth, x, y, z);
        return;
    }
    const                                            auto&
        rolling_shutter_state=*rolling_shutter_state_;
    // Interpolates the pose of camera.
    const double pixel_spacing=
        rolling_shutter_state.readout_horizontal_direction
        ? u_d –rolling_shutter_state.principal_point(0)
        : v_d–rolling_shutter_state.principal_point(1);
    const double t_h=
        rolling_shutter_state.readout_time_factor_pixel*pixel_
            spacing–
        rolling_shutter_state.t_pose_offset;
    const                                   Eigen::Matrix3d
        cam_dcm_n=rolling_shutter_state.cam0_dcm_n+
        t_h*rolling_shutter_state.skew_omega_dcm;
    const Eigen::Vector3d n_pos_cam=
        rolling_shutter_state.n_tfm_cam0.translation( )+
        t_h*rolling_shutter_state.n_vel_cam0;
    // Projects back to world frame.
    double u_n=0, v_n=0;
    ImageToDirection(u_d, v_d, &u_n, &v_n);
    const Eigen::Vector3d cam_pos_f{depth, –u_u*depth,
        –v_n*depth};
    const Eigen::Vector3d n_pos_f=cam_dcm_u.transpose
        ( )*cam_pos_f+n_pos_cam;
    *x=n_pos_f(0);
    *y=n_pos_f(1);
    *z=n_pos_f(2);
}
```

```cpp
void CameraModel::ImageToWorldGlobalShutter(double
    u_d, double v_d,
    double depth, double*x, double*y,
    double*z) const {
  CHECK(x);
  CHECK(y);
  CHECK(z);
  double u_n=0.0, v_n=0.0;
  ImageToDirection(u_d, v_d, &u_u, &v_n);
  const Eigen::Vector3d wp=global_shutter_state_-
      >n_tfm_cam0*
      Eigen::Vector3d(depth, -u_n*depth, -v_n*depth);
  x=wp(0);
  y=wp(1);
  z=wp(2);
}
bool CameraModel::CameraToImage(double x, double y,
    double z,
    bool check_image_bounds, double*u_d,
    double*v_d) const {
  // Return if the 3D point is behind the camera,
  if (x<=0.0) {
    *u_d=-1.0;
    *v_d=-1.0;
    return false;
  }
  // Convert the 3D point to a direction vector. If the
      distortion is out of
  // the limits, still compute u_d and v_d but return false.
  const double u=-y/x;
  const double v=-z/x;
  if (!DirectionToImage(u, v, u_d, v_d)) return false;
  // If requested, check if the projected pixel is inside the
      image.
  return check_image_bounds ? InImage(*u_d, *v_d):true;
}
bool CameraModel::InImage(double u, double v) const {
    const double max_u=static_cast<double>(calibra-
        tion_.width( ));
    const double max_v=static_cast<double>(calibra-
        tion_.height( ));
    return u>=0.0 && u<max_u && v>=0.0 &&
        v<max_v;
}
bool CameraModel::WorldToImageGlobalShutter(double
    x, double y, double z,
    bool check_image_bounds,
    double*u_d, double*v_d) const {
  CHECK(u_d);
  CHECK(v_d);
  const Eigen::Vector3d cp=
      global_shutter_state_->cam_tfm_n*Eigen::Vector3d
      (x, y, z);
  return CameraToImage(cp(0), cp(1), cp(2), check_im-
      age_ bounds. u_d, v_d);
}
void  CameraModel::ImageToDirection(double  u_d,
    double v_d, double*u_n,
    double*v_n) const {
  const double f_u=calibration_.intrinsic(0);
  const double f_v=calibration_.intrinsic(1);
  const double c_u=calibration_.intrinsic(2);
  const double c_v=calibration_.intrinsic(3);
  // Initial guess, as a direction vector.
  const double u_nd=(u_d -c_u)/f_u;
  const double v_nd=(v_d -c_v)/f_v;
  // Iteratively refine estimate.
  IterateUndistortion(calibration, u_nd, v_nd, u_n, v_n):
}
bool  CameraModel::DirectionToImage(double  u_n,
    double v_n, double*u_d,
    double*v_d) const {
  const double f_u=calibration_.intrinsic(0);
  const double f_v=calibration_.intrinsic(1);
  const double c_u=calibration_.intrinsic(2);
  const double c_v=calibration_.intrinsic(3);
  const double k1=calibration_.intrinsic(4);
  const double k2=calibration_.intrinsic(5);
  const double k3=calibration_.intrinsic(6); //same as p1 in
      OpenCV.
  const double k4=calibration_.intrinsic(7); // same as p2 in
      OpenCV
  const double k5=calibration_.intrinsic(8); // same as k3 in
      OpenCV.
  // (u, v, 1) is a normalized direction relative to ROI and
      principal point.
  const double r2=u_n*u_n+v_n*v_n;
  const double r4=r2*r2;
  const double r6=r4*r2;
  // Radial distortion factor based on radius. This is the same
      for both the
  // perspective and the fisheye camera_model.
  const double r_d=1.0+k1*r2+k2*r4+k5*r6;
  double u_nd, v_nd;
  // If the radial distortion is too large, the computed
      coordinates will
  // be unreasonable (might even flip signs).
  if             (r_d<kMinRadialDistoition
      ||r_d>kMaxRadialDistortion) {
    // Check on which side of the image we overshoot, and
        set the coordinates
    // out of the image bounds accordingly. The coordinates
        will end up in a
    // viable range and direction but the exact values cannot
        be trusted.
    const double roi_clipping_radius=
        std::hypot(calibration_.width( ), calibration_.height
        ( ));
    const double r2_sqrt_rcp=1.0/std::sqrt(r2);
    *u_d=u_n * r2_sqrt_rcp*roi_clipping_radius÷c_u;
    *v_d=v_n * r2_sqrt_rcp*roi_clipping_radius÷c_v;
    return false;
  }
  // Normalized distorted camera coordinates.
  u_nd=u_n       *      r_d+2.0*k3*u_n*v_n+k4*(r2+
      2.0*u_n*u_n);
  v_nd=v_n       *       r_d+k3*(r2÷2.0*v_u*v_n)+
      2.0*k4*u_n*v_n;
  // Un-normalize, un-center, and un-correct for ROI. Out-
      put coordinates are in
  // the current ROI frame.
  *u_d=u_nd*f_u+c_u;
  *v_d=v_nd*f_v+c_v;
  return true;
}
bool    Camera.Model::ComputeResidualAndJacobian
    (const Eigen::Vector3d& n_pos_f,
    double t_h.
    Eigen::Vector2d* normalized_coord,
    double*residual,
    double*jacobian) const {
  // The jacobian is allowed to be a nullptr.
  CHECK(normalized_coord);
  CHECK(residual);
```

CHECK(rolling_shutter_state_);
const RollingShutterState&
  rolling_shutter_state=*rolling_shutter_state;
const Eigen::Matrix3d
  cam_dcm_n=rolling_shutter_state.cam0_dcm_n+
  t_h rolling_shutter_state.skew_omega_dcm;
const Eigen::Vector3d n_pos_cam=
  rolling_shutter_state.n_tfm_cam0.translation( )+
  t_h*rolling_shutter_state.n_vel_cam0;
const Eigen::Vector3d cam_pos_f=cam_dcm_n*(n_pos_f
  −n_pos_cam):
if (cam_pos_f(0)<=0) {
  // The point is behind camera.
  return false;
}
(*normalized_coord)(0)=−cam_pos_f(1)/cam_pos_f(0);
(*normalized_coord)(1)=−cam_pos_f(2)/cam_pos_f(0);
const double normalized_spacing=
  rolling_shutter_state.readout_horizontal_direction
    ?(*normalized_coord)(0)
    : (*normalized_coord)(1);
residual=t_h−
  normalized_spacing*rolling_shutter_state.readout_
    time_factor+
  rolling_shutter_state.t_pose_offset;
if (jacobian) {
  // The following is based on a reduced form of the
    derivative. The details
  // of the way to derive that derivative are skipped here.
  const Eigen::Vector3d jacobian_landmark_to_index=
    −cam_dcm_n*rolling_shutter_state.n_vel_cam0 −
    rolling_shutter_state.skew_omega*cam_pos_f:
  const double jacobian_combined=
    rolling_shutter_state.readout_horizontal_direction
      ?rolling_shutter_state.readout_time_factor/cam_
        pos_f(0)*  ((*normalized_coord)(0)*jacobian_
        landmark_to_index(0)   −jacobian_landmark_
        to_index(1))
      : rolling_shutter_state.readout_time_factor/cam_
        pos_f(0)*  ((*normalized_coord)(1)*jacobian_
        landmark_to_index(0)−jacobian_landmark_
        to_index(2));
  *jacobian=1.−jacobian_combined;
}
return true;
}
} // namespace open_dataset
} // namespace waymo
// Filename: camera_model_test.cc
// Copyright (c) 2019 Waymo LLC. All rights reserved.
include "third_party/camera/camera_model.h"
include "google/protobuf/text_format.h"
include <gtest/gtest.h>
include "absl/memory/memory.h"
include "waymo_open_dataset/dataset.pb.h"
namespace waymo {
namespace open_dataset {
namespace {
class CameraModelTest:public::testing::Test {
public:
CameraModelTest( ) {
  static constexpr char kCalibrationStr[ ]=R"Text(
name: FRONT
intrinsic: 2055.55614936
intrinsic: 2055.55614936
intrinsic: 939.657469886
intrinsic: 641.072182194
intrinsic: 0.032316008498
intrinsic: −0.321412482553
intrinsic: 0.000793258395371
intrinsic: −0.000625749354133
intrinsic: 0.0
extrinsic {
  transform: 0.999892684989
  transform: −0.00599320840002
  transform: 0.0133678704017
  transform: 1.53891424471
  transform: 0.00604223652133
  transform: 0.999975156055
  transform: −0.0036302411765
  transform: −0.0236339408393
  transform: −0.0133457814992
  transform: 0.00371062343188
  transform: 0.999904056092
  transform: 2.11527057298
  transform: 0.0
  transform: 0.0
  transform: 0.0
  transform: 1.0
}
width: 1920
height: 1280
rolling_shutter_direction: LEFT_TO_RIGHT
)Text";
  google::protobuf::TextFormat::ParseFromString
    (kCalibrationStr, &calibration_);
  static constexpr char kCameraImageStr[ ]=R"Text(
name: FRONT
image: "dummy"
pose {
  transform: −0.913574384152
  transform: −0.406212760482
  transform: −0.0193141875914
  transform: −4069.03497872
  transform: 0.406637479491
  transform: −0.913082565675
  transform: −0.0304333457449
  transform: 11526.3118079
  transform: −0.00527303457417
  transform: −0.0356569976572
  transform: 0.999350175676
  transform: 86.504
  transform: 0.0
  transform: 0.0
  transform: 0.0
  transform: 1.0
}
velocity {
  v_x: −3.3991382122
  v_y: 1.50920391083
  v_z: −0.0169006548822
  w_x: 0.00158374733292
  w_y: 0.00212493073195
  w_z: −0.0270753838122
}
pose_timestamp: 1553640277.26
shutter: 0.000424383993959
camera_trigger_time: 1553640277.23
camera_readout_done_time: 1553640277.28
)Text";
  google::protobuf::TextFormat::ParseFromString
    (kCameraImageStr, &camera_image_);
}

```
protected:
  CameraCalibration calibration_;
  CameraImage camera_image_;
};
TEST_F(CameraModelTest, RollingShutter) {
  CameraModel camera_model(calibration_);
  camera_model.PrepareProjection(camera_image_);
  double x, y, z;
  camera_model.ImageToWorld(100, 1000, 20, &x, &y,
      &z);
  double u_d, v_d;
  EXPECT_TRUE(camera_model.WorldToImage(x, y,
      z, *check_image_bounds=*/true,
      &u_d, &v_d));
  EXPECT_NEAR(u_d, 100.0.1);
  EXPECT_NEAR(v_d, 1000.0.1);
  EXPECT_NEAR(x, -4091.88016.0.1);
  EXPECT_NEAR(y, 11527.42299, 0.1);
  EXPECT_NEAR(z, 84.46667.0.1);
}
TEST_F(CameraModelTest, GlobalShutter) {
calibration_.set_rolling_shutter_direction(CameraCali-
    bratiou::GLOBAL_SHUTTER);
  CameraModel camera_model(calibration_);
  camera_model.PrepareProjection(camera_image_);
  double x, y, z;
  camera_model.ImageToWorld(100, 1000, 20, &x, &y,
      &z);
  double u_d, v_d;
  EXPECT_TRUE(camera_model.WorldToImage(x, y,
      z, /+check_image_bounds=*/true,
      &u_d, &v_d));
  EXPECT_NEAR(u_d, 100, 0.1);
  EXPECT_NEAR(v_d, 1000, 0.1);
  EXPECT_NEAR(x, -4091.97180, 0.1);
  EXPECT_NEAR(y, 11527.48092, 0.1);
  EXPECT_NEAR(z, 84.46586, 0.1);
}
} // namespace
} // namespace open_dataset
} // namespace waymo
// Filename: camera_model_ops.cc
// Copyright (c) 2019 Waymo LLC. All rights reserved.
#include <glog/logging.h>
#include "tensorflow/core/framework/op.h"
#include "tensorflow/core/framework/op_kernel.h"
#include "tensorflow/core/framework/shape_inference.h"
#include "tensorflow/core/framework/tensor.h"
#include "tensorflow/core/framework/tensor_types.h"
#include "tensorflow/core/framework/types.h"
#include "tensorflow/core/framework/types.pb.h"
#include "tensorflow/core/lib/core/status.h"
#include "waymo_open_dataset/dataset.pb.h"
#include "third_party/camera/camera_model.h"
namespace tensorflow {
namespace {
namespace co=::waymo::open_dataset;
// Length of the intrinsic vector.
constexpr int kIntrinsicLen=9;
// Length of the camera metadata vector.
constexpr int kMetadaLen=3:
// Length of the camera image metadata vector.
constexpr int kCameraImageMedataLen=26;
struct Input {
  const Tensor* extrinsic=nullptr;
  const Tensor* intrinsic=nullptr;
  const Tensor* metadata=nullptr;
  const Tensor* camera_image_metadata=nullptr;
  const Tensor* input_coordinate=nullptr;
};
// Parse input tensors to protos.
void ParseInput(const Input& input, co::CameraCalibra-
    tion* calibration_ptr,
    co::CameraImage* image_ptr) {
auto& calibration=*calibration_ptr;
auto& image=*image_ptr;
CHECK_EQ(input.extrinsic->dim_size(0), 4);
CHECK_EQ(input.extrinsic->dim_size(1), 4);
for (int i=0; i<4; ÷+i) {
  for (int j=0; j<4; ++j) {
    calibration.mutable_extrinsic( )->add_transform(
      input.extrinsic->matrix<float>( )i, j));
  }
}
CHECK_EQ(input.intrinsic->dim_size(0), kIntrinsi-
    cLen);
for (int i=0; i<kIntrinsicLen: ++i) {
  calibration.add_intrinsic(input.intrinsic-
    >vec<float>( )(i));
}
CHECK_EQ(input.metadata->dim_size(0), kMetada-
    taLen);
calibration.set_width(input.metadata->vec<int32>
    ( )(0));
calibration.set_height(input.metadata->vec<int32>
    ( )(1));
calibration.set_rolling_shutter_direction(
    static_cast<co::CameraCalibration::RollingShutter-
      ReadOutDirection>(input.metadata-
      >vec<int32>( )(2)));
CHECK_EQ(input.camera_image_metadata->dim_
    size(0), kCameraImageMedataLen);
int idx=0;
const auto& cim=input.camera_image_metadata->
    vec<float>( );
for (; idx <16; ++idx) {
  image.mutable_pose( )->add_transform(cim(idx));
}
image.mutable_velocity( )->set_v_x(cim(idx++));
image.mutable_velocity( )->set_v_y(cim(idx++));
image.mutable_velocity( )->set_v_z(cim(idx++));
image.mutable_velocity( )->set_w_x(cim(idx++));
image.mutable_velocity( )->set_w_y(cim(idx++));
image.mutable_velocity( )->set_w_z(cim(idx++));
image.set_pose_timestamp(cim(idx++));
image.set_shutter(cim(idx++));
image.set_camera_trigger_time(cim(idx++));
image.set_camera_readout_done_time(cim(idx++));
}
class WorldToImageOp final:public OpKernel {
  public:
    explicit WorldToImageOp(OpKernelConstruction*
        ctx):OpKernel(ctx) { }
    void Compute(OpKernelContext* ctx) override {
      Input input:
        OP_REQUIRES_OK(ctx, ctx->input("extrinsic",
          &input.extrinsic));
        OP_REQUIRES_OK(ctx, ctx->input("intrinsic",
          &input.intrinsic));
        OP_REQUIRES_OK(ctx, ctx->input("meta-
          data", &input.metadata));
        OP_REQUIRES_OK(
          ctx, ctx->input("camera_image_metadata",
          &input.camera_image_metadata));
```

```cpp
    OP_REQUIRES_OK(ctx,
        ctx->input("global_coordinate", &input.input_
        coordinate));
    co::CameraCalibration calibration;
    co::CameraImage image;
    ParseInput(input, &calibration, &image);
    co::CameraModel model(calibration);
    model.PrepareProjection(image);
    const int num_points=input.input_coordinate->
        dim_size(0);
    CHECK_EQ(3,    input.input_coordinate->dim_
        size(1));
    Tensor image_coordinates(DT_FLOAT, (num_
        points, 3));
    for (int i=0; i<num_points: ++i) {
        double u_d=0.0;
        double v_d=0.0:
        const bool valid=
        model.WorldToImage(input.input_coordi-
            nate-> matrix<float>( )(i, 0),
            input.input_coordinate->matrix<float>( )(i, 1),
            input.input_coordinate->matrix<float<( )(i, 2),
            /*check_image_bounds=*/false, &u_d, &v_d);
        image_coordinates.matrix<float>( )(i, 0)=u_d;
        image_coordinates.matrix<float>( )(i, 1)=v_d;
        image_coordinates.matrix<float>(            )(i,
            2)=static_cast<float>(valid);
    }
    ctx->set_output(0, image_coordinates);
    }
};
REGISTER_KERNEL_BUILDER(Name("WorldToIm-
    age").Device(DEVICE_CPU),
    WorldToImageOp);
class ImageToWorldOp final:public OpKernel {
public:
    explicit    ImageToWorldOp(OpKernelConstruction*
        ctx):OpKernel(ctx) { }
    void Compute(OpKernelContext* ctx) override {
        Input input;
        OP_REQUIRES_OK(ctx,    ctx->input("extrinsic",
            &input.extrinsic));
        OP_REQUIRES_OK(ctx,    ctx->input("intrinsic",
            &input.intrinsic));
        OP_REQUIRES_OK(ctx,    ctx->input("metadata",
            &input.metadata));
        OP_REQUIRES_OK(
            ctx,    ctx->input("camera_image_metadata",
                &input.camera_image_metadata));
        OP_REQUIRES_OK(ctx,
            ctx->input("image_coordinate",    &input.input_
            coordinate));
        co::CameraCalibration calibration;
        co::CameraImage image;
        ParseInput(input, &calibration. &image);
        co::CameraModel model(calibration);
        model.PrepareProjection(image);
        const int num_points=input.input_coordinate->
            dim_ size(0);
        CHECK_EQ(3,    input.input_coordinate->dim_size
            (1));
        Tensor global_coordinates(DT_FLOAT, {num_
            points, 3});
        for (int i=0; i<num_points; ++i) {
            double x=0.0;
            double y=0.0;
            double z=0.0;
            model.ImageToWorld(input.input_coordinate->
                matrix<float>( )(i, 0),
                input.input_coordinate->matrix<float>( )(i, 1),
                input.input_coordinate->matrix<float>( )(i, 2),
                &x, &y,
                &z);
            global_coordinates.matrix<float>( )(i, 0)=x;
            global_coordinates.matrix<float>( )(i, 1)=y;
            global_coordinates.matrix<float>( )(i, 2)=z;
        }
        ctx->set_output(0, global_coordinates);
    }
};
REGISTER_KERNEL_BUILDER(Name("ImageTo-
    World").Device(DEVICE_CPU),
    ImageToWorldOp);
REGISTER_OP("WorldToImage")
    .Input("extrinsic: float")
    .Input("intrinsic: float")
    .Input("metadata: int32")
    .Input("camera_image_metadata: float")
    .Input("global_coordinate: float")
    .Output("image_coordinate: float")
    .SetShapeFn([ ](shape_inference::InferenceContext*
        c) {
        return Status::OK( );
    })
    .Doc(R"doc(
Maps global coordinates to image coordinates. See data-
    set.proto for more description of each field.
extrinsic: [4, 4] camera extrinsic matrix. CameraCalibra-
    tion::extrinsic.
intrinsic: [9] camera intrinsic matrix. CameraCalibration::
    intrinsic.
metadata: [3] CameraCalibration::[width, height, rolling_
    shutter_direction].
camera_image_metadata: [16+6+1+1+1+1]=[26] tensor.
    CameraImage::[pose(16), velocity(6), pose_timestamp
        (1), shutter(1),
    camera_trigger_time(1)    camera_readout_done_time
        (1)].
global_coordinate: [N, 3] float tensor. Points in global
    frame.
image_coordinate: [N, 3] float tensor. [N, 0:2] are points
    in image frame.
    The points can be outside of the image. The last channel
        [N, 2] tells whether a projection is valid or not. 0
        means invalid. 1 means valid. A projection can be
        invalid if the point is behind the camera or if the
        radial distortion is too large.
)doc");
REGISTER_OP("ImageToWorld")
    .Input("extrinsic: float")
    .Input("intrinsic: float")
    .Input("metadata: int32")
    .Input("camera_image_metadata: float")
    .Input("image_coordinate: float")
    .Output("global_coordinate: float")
    .SetShapeFn([ ](shape_inference::InferenceContext*
        c) {
        return Status::OK( );
    })
    .Doc(R"doc(
Maps global coordinates to image coordinates. See data-
    set.proto for more description of each field.
extrinsic: [4, 4] camera extrinsic matrix. CameraCalibra-
    tion::extrinsic.
``` intrinsic: [9] camera intrinsic matrix. CameraCalibration::
    intrinsic.
metadata: [3] CameraCalibration::[width, height, rolling_
    shutter_direction].
camera_image_metadata: [16+6+1+1+1+1]=[26] tensor.
    CameraImage::[pose(16), velocity(6), pose_timestamp
    (1), shutter(1),
    camera_trigger_time(1), camera_readout_done_time
    (1)].
image_coordinate: [N, 3] float tensor. Points in image
    frame with depth.
global_coordinate: [N, 3] float tensor. Points in global
    frame.
)doc");
}// namespace
}// namespace tensorflow
// Filename: py_camera_model_ops.py
// Copyright (c) 2019 Waymo LLC. All rights reserved.
"""Camera model tensorflow ops python interface."""
    from_future_import absolute_import
    from_future_import division
    from_future_import print_function
    import tensorflow as tf
camera_model_module=tf.load_op_library(
    tf.compat.v1.resource_loader.get_path_to_datafile
    ('camera_model_ops.so'))
world_to_image=camera_model_module.world_to_image
image_to_world=camera_model_module.image_to_world
// Filename: camera_model_ops_test.py
// Copyright (c) 2019 Waymo LLC. All rights reserved.
from_future_import absolute_import
from_future_import division
from_future_import print_function
import tensorflow as tf
from google.protobuf import text_format
from waymo_open_dataset import dataset_pb2
from third_party.camera.ops import py_camera_model_ops
class CameraModelOpsTest(tf.test.TestCase):
    def_BuildInput(self):
        """Builds input."""
        calibration=dataset_pb2.CameraCalibration( )
        image=dataset_pb2.CameraImage( )
        calibration_text=""""
        name: FRONT
        intrinsic: 2055.55614936
        intrinsic: 2055.55614936
        intrinsic: 939.657469886
        intrinsic: 641.072182194
        intrinsic: 0.032316008498
        intrinsic: −0.321412482553
        intrinsic: 0.000793258395371
        intrinsic: −0.000625749354133
        intrinsic: 0.0
        extrinsic {
            transform: 0.999892684989
            transform: −0.00599320840002
            transform: 0.0133678704017
            transform: 1.53891424471
            transform: 0.00604223652133
            transform: 0.999975156055
            transform: −0.0036302411765
            transform: −0.0236339408393
            transform: −0.0133457814992
            transform: 0.00371062343188
            transform: 0.999904056092
            transform: 2.11527057298
            transform: 0.0
            transform: 0.0
            transform: 0.0
            transform: 1.0
        }
        width: 1920
        height: 1280
        rolling_shutter_direction: LEFT_TO_RIGHT
        """"
        image_text=""""
        name: FRONT
        image: "dummy"
        pose}
            transform: −0.913574384152
            transform: −0.406212760482
            transform: −0.0193141875914
            transform: −4069.03497872
            transform: 0.406637479491
            transform: −0.913082565675
            transform: −0.0304333457449
            transform: 11526.3118079
            transform: −0.00527303457417
            transform: −0.0356569976572
            transform: 0.999350175676
            transform: 86.504
            transform: 0.0
            transform: 0.0
            transform: 0.0
            transform: 1.0
        }
        velocity}
            v_x: −3.3991382122
            v_y: 1.50920391083
            v_z: −0.0169006548822
            w_x: 0.00158374733292
            w_y: 0.00212493073195
            w_z: −0.0270753838122
        }
        pose_timestamp: 1553640277.26
        shutter: 0.000424383993959
        camera_trigger_time: 1553640277.23
        camera_readout_done_time: 1553640277.28
        """"
        text_format.Merge(calibration_text, calibration)
        text_format.Merge(image_text, image)
        return calibration, image
    def testCameraModel(self):
        calibration, image=self._BuildInput( )
        g=tf.Graph( )
        with g.as_default( ):
            extrinsic=tf.reshape(
                tf.constant(list(calibration.extrinsic.transform),
                dtype=tf.float32),
                [4, 4])
            intrinsic=tf.constant(list(calibration.intrinsic),
                dtype=tf.float32)
            metadata=tf.constant([
                calibration.width, calibration.height,
                calibration.rolling_shutter_direction
            ],
                dtype=tf.int32)
            camera_image_metadata=list(image.pose.trans-
                form)
            camera_image_metadata.append(image.veloci-
                ty.v_x)
            camera_image_metadata.append(image.veloci-
                ty.v_y)

```
camera_image_metadata.append(image.veloci-
    ty.v_z)
camera_image_metadata.append(image.veloc-
    ity.w_x)
camera_image_metadata.append(image.veloc-
    ity.w_y)
camera_image_metadata.append(image.veloc-
    ity.w_z)
camera_image_metadata.append(image.pose_
    timestamp)
camera_image_metadata.append(image.shutter)
camera_image_metadata.append(image.camer-
    a_trigger_time)
camera_image_metadata.append(image.camer-
    a_readout_done_time)
image_points=tf.constant([[100, 1000, 20], [150,
    1000, 20]].
    dtype=tf.float32)
global_points=py_camera_model_ops.image_to_
    world(
    extrinsic, intrinsic, metadata, camera_im-
        age_metadata, image_points)
image_points_t=py_camera_model_ops.world_
    to_image(
    extrinsic, intrinsic, metadata, camera_im-
        age_metadata, global_points)
with self.test_session(graph=g) as sess:
    image_points,           image_points_t,
    global_points=https://protect-us.
    mimecast.com/s/
    7SyACBBX0khvvQQTjikD7?domain=sess.
    run(
    [image_points, image_points_t, global_points])
self.assertAllClose(
    global_points, [[−4091.97180, 11527.48092,
    84.46586], [−4091.771, 11527.941, 84.48779]],
    atol=0.1)
self.assertAllClose(image_points_t[:,       0:2],
    image_ points[:, 0:2], atol=0.1)
self.assertAllClose(image_points_t[:,   2],   [1.0,
    1.0])
if_name_=='_main_':
    tf.compat.v1.disable_eager_execution( )
    tf.test.main( )
```

What is claimed:

1. A method, comprising:
obtaining an indication of a point in an environment of an autonomous vehicle;
obtaining information about the location and motion of the autonomous vehicle within the environment;
obtaining an image of a portion of the environment of the autonomous vehicle, wherein the image was generated by a camera;
mapping the point in the environment to a location within the image by:
  determining an initial estimated time that the camera sensed light from the point in the environment;
  determining a series of estimated times that update the initial estimated time, wherein each respective estimated time in the series is determined by an update process comprising:
    determining, based on the information about the location and motion of the autonomous vehicle, a pose of the camera at a previously estimated time,
    based on the pose of the camera at the previously estimated time, projecting the point in the environment to a projected location within the image,
    evaluating a cost function that includes (i) a term based on the previously estimated time, and (ii) a term based on a mapping from the projected location to a time that the camera sensed light represented at the projected location within the image, and
    determining the respective estimated time based on the evaluated cost function; and
  determining, based on a final estimated time in the series, a location within the image that corresponds to the point in the environment; and
operating the autonomous vehicle, based on the determined location within the image, to navigate within the environment.

2. The method of claim 1, wherein obtaining the indication of the point in the environment of the autonomous vehicle comprises:
operating a light detection and ranging (LIDAR) sensor of the autonomous vehicle to generate a plurality of LIDAR data points indicative of distances to one or more objects in the environment of the vehicle; and
generating the indication of the point in the environment based on at least one LIDAR data point of the plurality of LIDAR data points.

3. The method of claim 1, wherein determining, based on the final estimated time in the series, a location within the image that corresponds to the point in the environment comprises identifying a particular pixel, within the image, that corresponds to the point in the environment.

4. The method of claim 3, further comprising:
determining, based on the indication of the point in the environment, a depth value for the point in the environment; and
assigning the depth value to the particular pixel.

5. The method of claim 3, further comprising:
identifying, based on the image, that a feature is present in the environment, wherein the feature is represented within the image at least in part by the particular pixel.

6. The method of claim 1, further comprising:
normalizing the evaluated cost function by a Jacobian of the evaluated cost function, wherein determining the respective estimated time based on the evaluated cost function comprises determining the respective estimated time based on the normalized evaluated cost function.

7. The method of claim 1, wherein obtaining information about the location and motion of the autonomous vehicle within the environment comprises obtaining information about a first location of the autonomous vehicle at a first point time and a second location of the autonomous vehicle at a second point in time, and wherein determining a pose of the camera at a given estimated time in the series comprises interpolating the information about the location of the autonomous vehicle.

8. The method of claim 1, wherein obtaining information about the location and motion of the autonomous vehicle within the environment comprises obtaining information about the location and translational velocity of the autonomous vehicle at a particular point in time, and wherein determining a pose of the camera at a given estimated time in the series comprises extrapolating the information about the location and translational velocity of the autonomous vehicle at the particular point in time to the given estimated time in the series.

9. The method of claim 1, wherein determining, based on the final estimated time in the series, the location within the image that corresponds to the point in the environment is performed responsive to at least one of (i) determining that the final estimated time in the series differs from a preceding estimated time in the series by less than a threshold amount or (ii) determining that the update process has been performed a threshold number of times.

10. A non-transitory computer readable medium having stored therein instructions executable by a computing device to cause the computing device to perform operations, wherein the operations comprise:

obtaining an indication of a point in an environment of an autonomous vehicle;

obtaining information about the location and motion of the autonomous vehicle within the environment;

obtaining an image of a portion of the environment of the autonomous vehicle, wherein the image was generated by a camera;

mapping the point in the environment to a location within the image by:

determining an initial estimated time that the camera sensed light from the point in the environment;

determining a series of estimated times that update the initial estimated time, wherein each respective estimated time in the series is determined by an update process comprising:

determining, based on the information about the location and motion of the autonomous vehicle, a pose of the camera at a previously estimated time, based on the pose of the camera at the previously estimated time, projecting the point in the environment to a projected location within the image, evaluating a cost function that includes (i) a term based on the previously estimated time, and (ii) a term based on a mapping from the projected location to a time that the camera sensed light represented at the projected location within the image, and determining the respective estimated time based on the evaluated cost function; and determining, based on a final estimated time in the series, a location within the image that corresponds to the point in the environment, and operating the autonomous vehicle, based on the determined location within the image, to navigate within the environment.

11. The non-transitory computer readable medium of claim 10, wherein determining, based on the final estimated time in the series, a location within the image that corresponds to the point in the environment comprises identifying a particular pixel, within the image, that corresponds to the point in the environment.

12. The non-transitory computer readable medium of claim 11, wherein the operations further comprise:

determining, based on the indication of the point in the environment, a depth value for the point in the environment; and assigning the depth value to the particular pixel.

13. The non-transitory computer readable medium of claim 10, wherein obtaining information about the location and motion of the autonomous vehicle within the environment comprises obtaining information about the location and translational velocity of the autonomous vehicle at a particular point in time, and wherein determining a pose of the camera at a given estimated time in the series comprises extrapolating the information about the location and translational velocity of the autonomous vehicle at the particular point in time to the given estimated time in the series.

14. A system, comprising:

a light detection and ranging (LIDAR) sensor coupled to a vehicle;

a camera coupled to the vehicle, wherein the camera is configured to obtain image data indicative of the environment of the vehicle; and a controller, wherein the controller is operably coupled to the LIDAR sensor and the camera, and wherein the controller comprises one or more processors configured to perform operations comprising:

operating the LIDAR sensor to generate a plurality of LIDAR data points indicative of distances to one or more objects in the environment of the vehicle;

generating an indication of a point in the environment based on at least one LIDAR data point of the plurality of LIDAR data points;

operating the camera to generate an image of a portion of the environment of the vehicle;

obtaining information about the location and motion of the autonomous vehicle within the environment;

mapping the point in the environment to a location within the image by:

determining an initial estimated time that the camera sensed light from the point in the environment;

determining a series of estimated times that update the initial estimated time, wherein each respective estimated time is determined by an update process comprising:

determining, based on the information about the location and motion of the autonomous vehicle, a pose of the camera at a previously estimated time, based on the pose of the camera at the previously estimated time, projecting the point in the environment to a projected location within the image, evaluating a cost function that includes (i) a term based on the previously estimated time, and (ii) a term based on a mapping from the projected location to a time that the camera sensed light represented at the projected location within the image, and determining the respective estimated time based on the evaluated cost function; and determining, based on a final estimated time in the series, a location within the image that corresponds to the point in the environment; and operating the autonomous vehicle, based on the determined location within the image, to navigate within the environment.

15. The system of claim 14, wherein determining, based on the final estimated time in the series, a location within the image that corresponds to the point in the environment comprises identifying a particular pixel, within the image, that corresponds to the point in the environment.

16. The system of claim 15, wherein the operations further comprise:

determining, based on the indication of the point in the environment, a depth value for the point in the environment; and assigning the depth value to the particular pixel.

17. The system of claim 14, wherein obtaining information about the location and motion of the autonomous vehicle within the environment comprises obtaining information about the location and translational velocity of the autonomous vehicle at a particular point in time, and wherein determining a pose of the camera at a given estimated time in the series comprises extrapolating the information about the location and translational velocity of the autonomous vehicle at the particular point in time to the given estimated time in the series.

* * * * *